United States Patent
Nakada et al.

(10) Patent No.: US 11,953,820 B2
(45) Date of Patent: Apr. 9, 2024

(54) LIGHT SHIELDING UNIT AND LENS BARRELL PROVIDED WITH SAME

(71) Applicant: Panasonic Intellectual Property Management Co., Ltd., Osaka (JP)

(72) Inventors: Toshiyuki Nakada, Osaka (JP); Tetsuya Uno, Osaka (JP); Satoshi Fukuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 294 days.

(21) Appl. No.: 16/802,472

(22) Filed: Feb. 26, 2020

(65) Prior Publication Data

US 2020/0278590 A1 Sep. 3, 2020

(30) Foreign Application Priority Data

Feb. 28, 2019 (JP) .................................. 2019-035198

(51) Int. Cl.
*G03B 9/06* (2021.01)
*G02B 7/02* (2021.01)
*G03B 17/42* (2021.01)

(52) U.S. Cl.
CPC ............... *G03B 9/06* (2013.01); *G02B 7/021* (2013.01); *G02B 7/026* (2013.01); *G03B 17/425* (2013.01)

(58) Field of Classification Search
CPC .................................. G03B 9/06; G03B 17/425
See application file for complete search history.

(56) References Cited

U.S. PATENT DOCUMENTS

| 7,290,947 | B2 | 11/2007 | Naganuma |
| 9,715,104 | B2 | 7/2017 | Kozu et al. |
| 2006/0033821 | A1 | 2/2006 | Naganuma |
| 2014/0111843 | A1 | 4/2014 | Kozu et al. |

FOREIGN PATENT DOCUMENTS

| JP | 09189937 A | * | 7/1997 |
| JP | 2006-053410 A | | 2/2006 |
| JP | 2013-097178 A | | 5/2013 |
| JP | 2015-049387 A1 | | 3/2015 |
| JP | 2016-090589 A | | 5/2016 |
| JP | 2016-102830 A | | 6/2016 |

(Continued)

OTHER PUBLICATIONS

JP09189937A English Machine Translation, STIC/Foreign Patent Service Center, date of retrieval Jul. 11, 2023.*

*Primary Examiner* — Minh Q Phan
(74) *Attorney, Agent, or Firm* — Renner, Otto, Boisselle & Sklar, LLP

(57) ABSTRACT

An aperture unit includes a base plate, a cover, a plurality of aperture blades, a drive ring, and protrusions. The aperture blades are disposed between the base plate and the cover, and adjust the amount of light passing through by varying the size of an opening. The drive ring is disposed between the base plate and the cover, and is rotationally driven when the aperture blades are opened and closed. The protrusions are provided to the drive ring and the cover, respectively, and support the aperture blades in the direction of suppressing upward warpage of the aperture blades in a state in which the aperture blades move in the direction of reducing the size of the opening.

33 Claims, 37 Drawing Sheets

(56) References Cited

FOREIGN PATENT DOCUMENTS

| | | | | |
|---|---|---|---|---|
| JP | 6068903 | B | | 1/2017 |
| JP | 2018-120032 | A | | 8/2018 |
| JP | 2018120032 | A | * | 8/2018 |
| JP | 2018-194672 | A | | 12/2018 |
| JP | 2018-205477 | A | | 12/2018 |
| JP | 2018-205482 | A | | 12/2018 |
| JP | 2018205477 | A | * | 12/2018 |
| JP | 2018205482 | A | * | 12/2018 |
| WO | 2013/005436 | A1 | | 1/2013 |

\* cited by examiner

LIGHT SHIELDING UNIT AND LENS BARREL PROVIDED WITH SAME

CROSS-REFERENCE TO RELATED APPLICATIONS

This application claims priority to Japanese Patent Application No. 2019-035198 filed on Feb. 28, 2019. The entire disclosure of Japanese Patent Application No. 2019-035198 is hereby incorporated herein by reference.

BACKGROUND

Technical Field

The present disclosure relates to a light shielding unit and to a lens barrel comprising the same.

Description of the Related Art

An imaging device such as a camera is provided with a plurality of lens groups, an aperture for adjusting the surface area of an opening through which light passes, a shutter unit, and so forth.

For example, Patent Literature 1 discloses a blade drive device comprising a plurality of blades disposed in a ring around a light passage path, and a drive ring for rotating these blades, in order to reduce upward warpage of the blade group. Each of the blades has an engaging portion that engages with a cam groove provided to the drive ring, and at least part of the cam groove is provided so as to be inclined outward in the radial direction of the drive ring.

CITATION LIST

Patent Literature

Patent Literature 1: JP-A 2016-102830
Patent Literature 2: Japanese Patent No. 6,068,903

SUMMARY

It is an object of the present disclosure to provide a light shielding unit capable of suppressing the warping of movable blades while affording smooth operation of the movable blades, as well as a lens barrel comprising this light shielding unit.

The light shielding unit according to the present disclosure comprises a first frame, a second frame, a plurality of movable blades, a drive ring, and a support. The first frame has a first frame having a first opening through which light passes. The second frame has a second opening through which light passes. The movable blades are disposed between the first frame and the second frame, a third opening through which the light that has passed through the first opening passes is formed in the movable blades, and these movable blades adjust the amount of light passing through by varying the size of the third opening. The drive ring is disposed between the first frame and the second frame and is rotatably driven when the movable blades are opened and closed. The support is provided to the first frame and/or the second frame and supports the movable blades in the direction of suppressing upward warpage of the movable blades in a state in which the movable blades have moved in the direction of reducing the size of the third opening.

Technical Effects

The light shielding unit according to the present disclosure allows upward warpage of the movable blades to be suppressed, while affording smooth operation of the movable blades.

DETAILED DESCRIPTION OF THE PREFERRED EMBODIMENTS

Knowledge on which this Disclosure is Based, etc.

The above-mentioned conventional blade drive device has the following problems.

With the device disclosed in the above-mentioned publication, part of the cam groove is inclined outward in the radial direction of the drive ring. Therefore, when the blades are driven, the bosses that move through the cam grooves are more likely to snag, which may cause the blades to malfunction.

Embodiments will now be described in detail with reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Figure 1:
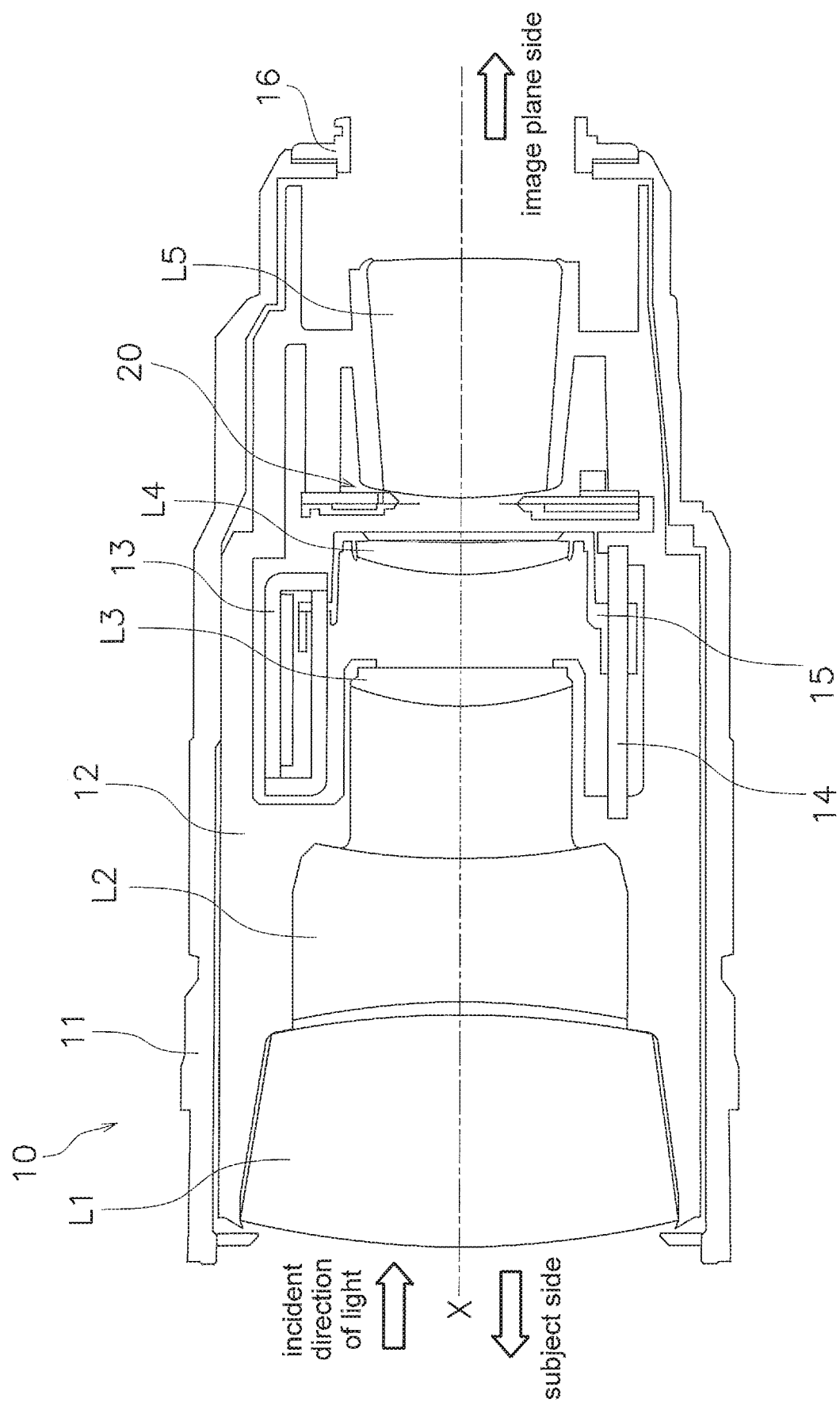
FIG. 1 is a cross section of the configuration of a lens barrel that includes the aperture unit according to an embodiment of the present disclosure.
Figure 2:
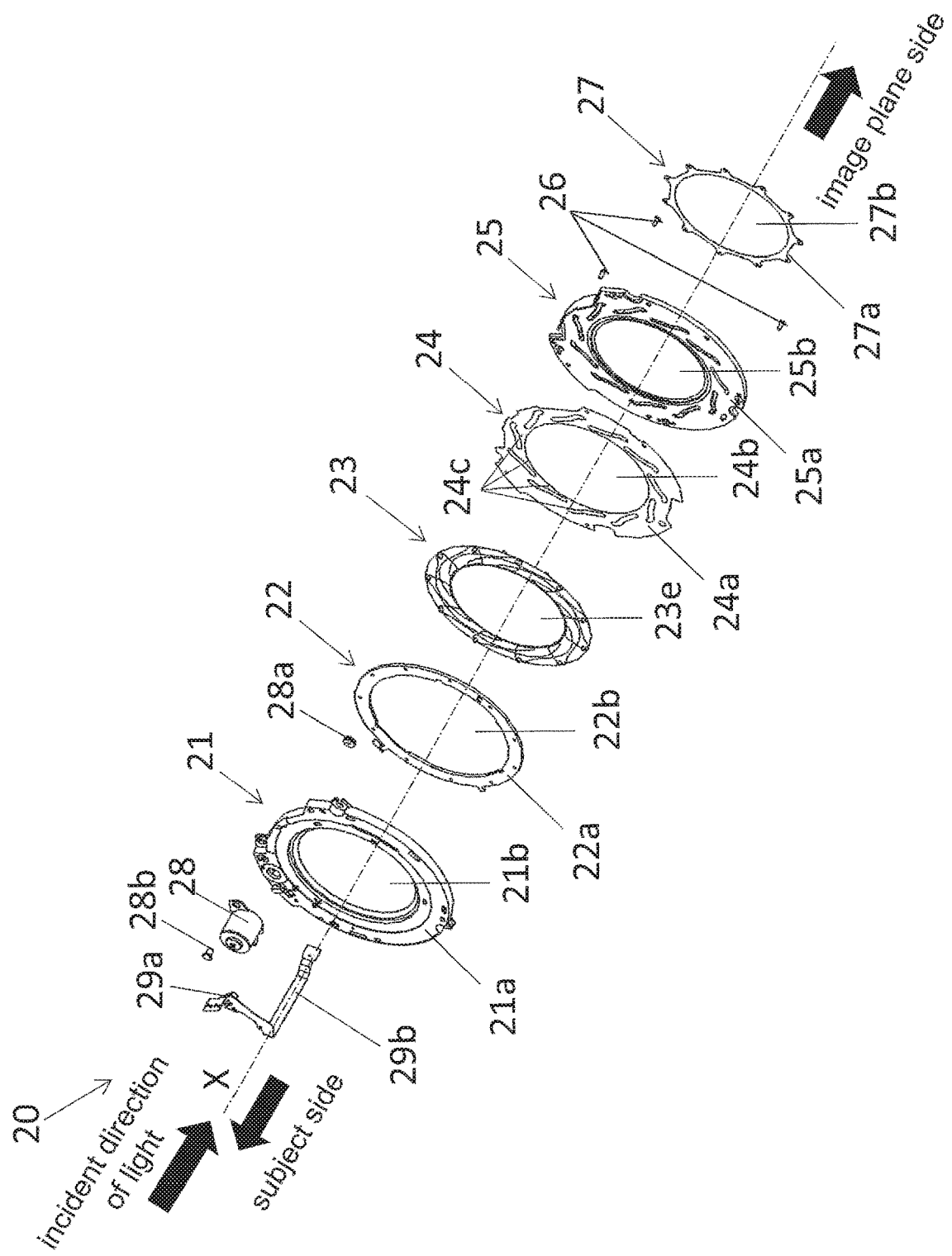
FIG. 2 is an exploded oblique view of the components constituting the aperture unit included in the lens barrel in FIG. 1.

The "subject side," "image plane side," and "light incident direction" referred to herein are shown in FIGS. 1 and 2. The "image plane side" and the "opposite side from the subject side" are the same side.

Embodiment 1

A lens barrel 10 including an aperture unit (light shielding unit) 20 according to an embodiment of the present disclosure will now be described with reference to FIGS. 1 to 20.

Here, the lens barrel 10 in this embodiment a configuration for suppressing the upward warpage of aperture blades 23 that occurs in a state in which the aperture blades (movable blades) 23 constituting the aperture unit (light shielding unit) 20 are constricted (a state in which the opening diameter is reduced). Specific configurations of these will be described below.

Figure 17A:
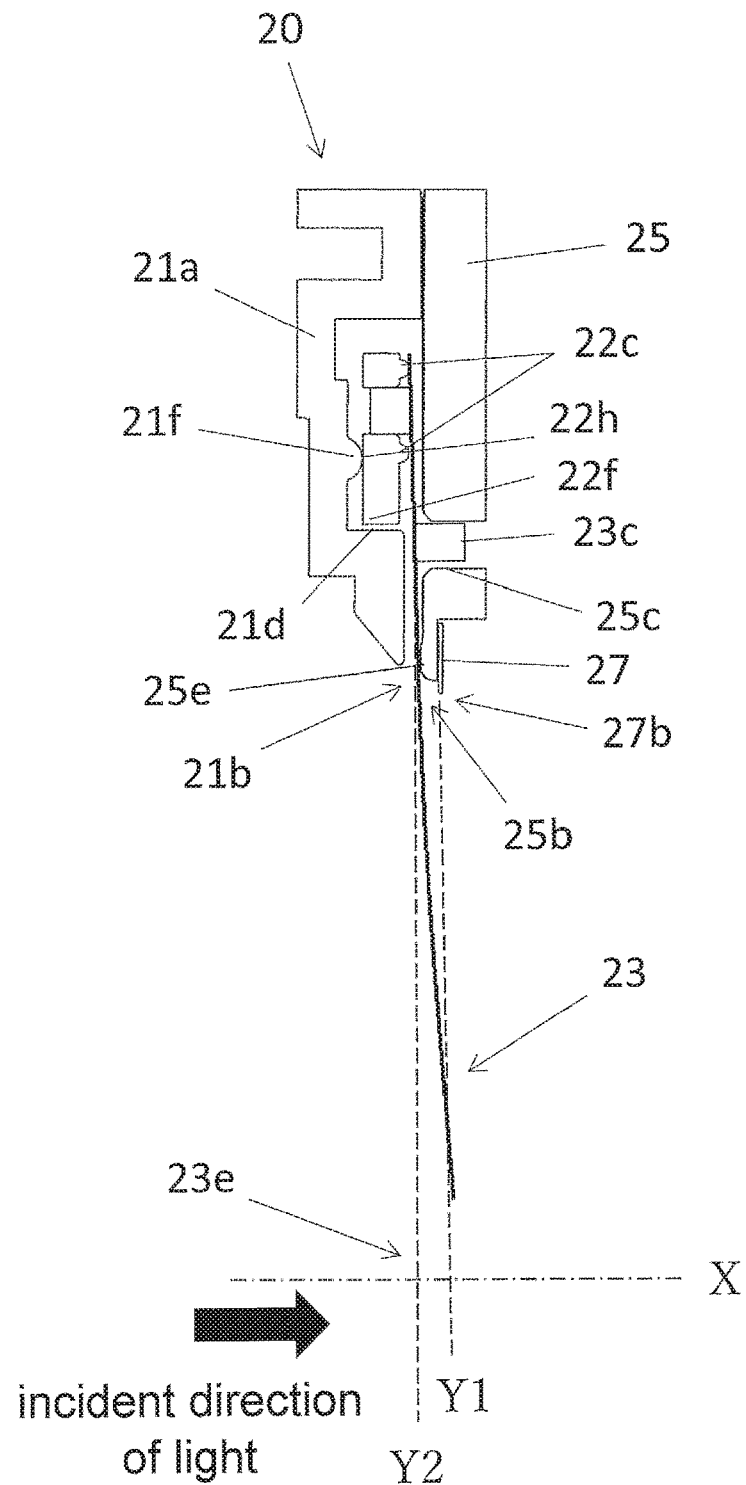
FIG. 17A is a cross section illustrating the positional relation between the aperture blades and a fixed opening sheet in the optical axis direction in a state in which the aperture blades of the aperture unit in FIG. 3 have been constricted (a state in which the opening diameter is reduced)

The "direction of the upward warpage of the aperture blades 23" is the direction in which the distal ends of the aperture blades 23 overlap with each other (are woven together) and expand when the aperture blades 23 are rotated in the direction of constricting the opening diameter, and in this embodiment, it means the direction on the image plane side, as shown in FIG. 17A, etc.

(1) Configuration of Lens Barrel 10

The lens barrel 10 according to this embodiment is an interchangeable lens barrel mounted on a camera body (not shown), and as shown in FIG. 1, it comprises an outer frame 11, an inner frame 12, an actuator 13, a guide pole 14, a fourth lens frame 15, a mount 16, first to fifth lenses L1 to L5, and an aperture unit 20. X is the optical axis defined by the first lens L1 to the fifth lens L5.

The outer frame 11 is a substantially cylindrical member, constitutes the outer contour of the lens barrel 10, and encompasses various components such as the first lens L1 to the fifth lens L5.

The inner frame 12 is disposed on the inner peripheral surface side of the outer frame 11, and holds the first lens L1 on the furthest upstream side in the light incident direction, the second lens L2 downstream of that, and the third lens L3 downstream of that. The inner frame 12 also holds the actuator 13 and the guide pole 14 substantially to the side of the third lens L3; the fourth lens frame 15 downstream from the third lens L3, holding it so that it can move on the guide pole 14 in the optical axis X direction; the aperture unit 20 downstream of that; and the fifth lens L5 downstream of that.

The actuator 13 is a focus motor that is driven for focusing, and is held by the inner frame 12. When power is supplied from an electric circuit (not shown), the actuator 13 moves the fourth lens frame 15, which holds the fourth lens (focus lens) L4, back and forth along the guide pole 14 in the optical axis X direction.

The guide pole 14 is a rod-shaped member that guides the fourth lens frame 15, which is driven by the actuator 13, back and forth in the optical axis X direction. The guide pole 14 is held by the inner frame 12 and is disposed parallel to the optical axis X direction.

The fourth lens frame 15 is included in the lens group constituting the optical system of the lens barrel 10, holds the fourth lens L4, which moves in the optical axis X direction to adjust the focus of a light beam incident on the lens, that is, for focusing, and is driven by the actuator 13.

Alternatively, the fourth lens frame 15 holds the fourth lens L4, which moves in the optical axis X direction to adjust the focal length of the light beam incident on the lens, that is, for zooming, and is driven in conjunction with the zoom operation. That is, the fourth lens frame 15 is movable in the optical axis direction for focusing and zooming.

The mount 16 is the portion that is mounted on the camera body (not shown), is held by the outer frame 11, and is disposed the furthest downstream in the light incident direction inside the lens barrel 10.

As shown in FIG. 1, the first lens L1 to the fifth lens L5 are optical systems for guiding light in the optical axis X direction, and are disposed in order starting from the subject side to the image plane side in the light incident direction.

Of all the lens groups included in the lens barrel 10, the first lens L1 is disposed closest to the subject.

The second lens L2 is disposed at a position close to the image plane side (opposite side from the subject side) of the first lens L1 inside the inner frame 12.

The third lens L3 is disposed inside the inner frame 12 at a position that is a specific distance away from the second lens L2 to the image plane side.

The fourth lens L4 is a focus lens provided inside the inner frame 12, can be moved back and forth in the optical axis X direction by the actuator 13, and is held by the fourth lens frame 15.

The fifth lens L5 is disposed downstream from the aperture unit 20 in the optical axis X direction, and is the closest to the image plane of all the lens groups included in the lens barrel 10.

The aperture unit 20 is disposed between the fourth lens L4 and the fifth lens L5 inside the inner frame 12, and adjusts the amount of light incident on an imaging element provided on the camera body side by adjusting the surface area or the opening diameter through which light transmitted from the first lens L1 through the fourth lens L4 passes. The configuration of the aperture unit 20 will be described in detail below.

(2) Configuration of Aperture Unit 20

With the lens barrel 10 in this embodiment, as shown in FIG. 1, the first lens L1 to the fourth lens are disposed closer to the subject than the aperture unit 20 in the optical axis X direction.

Figure 3:
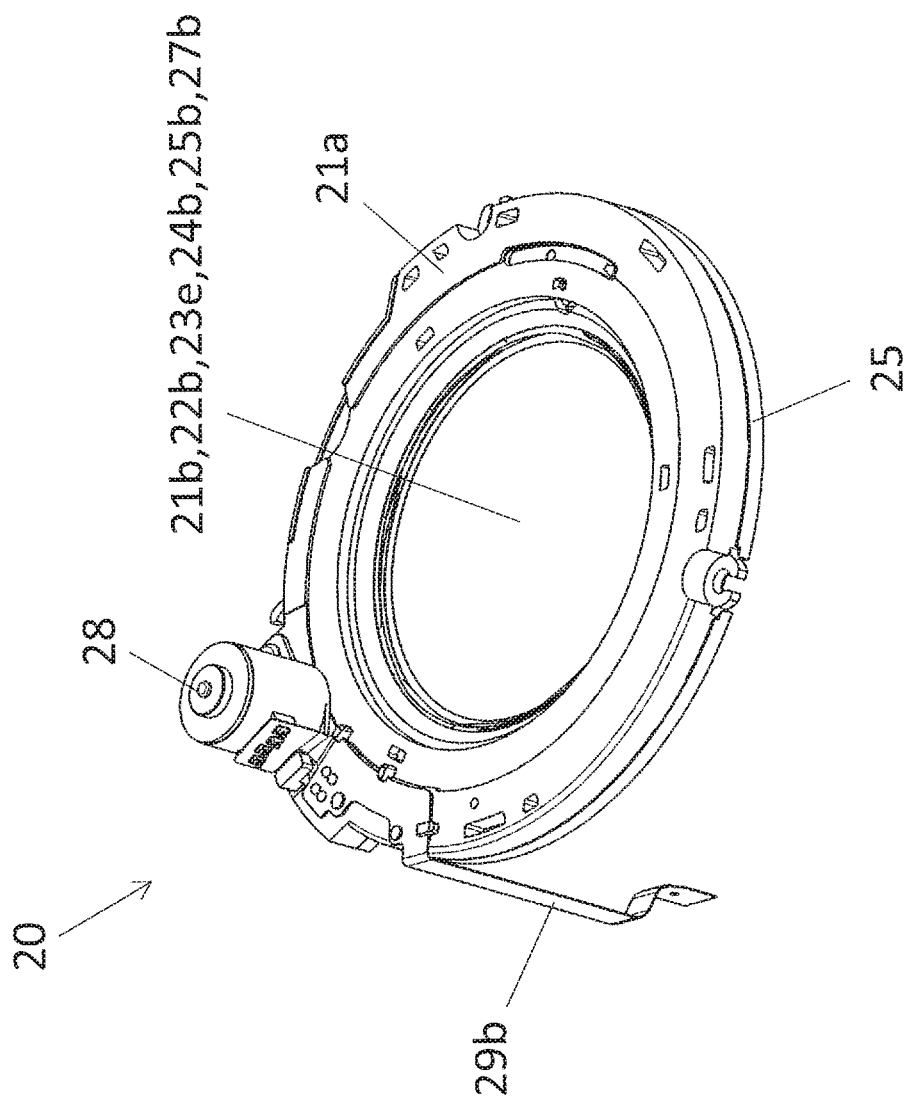
FIG. 3 is an oblique view of the aperture unit in FIG. 2.

As shown in FIG. 1, the aperture unit 20 is disposed downstream of the fourth lens L4 that functions as a focus lens. As shown in FIG. 2, the aperture unit 20 has a base plate (first frame) 21, a drive ring 22, a plurality of aperture blades (movable blades) 23, a sheet member 24, a cover (second frame) 25, attachment screws 26, a fixed opening sheet (fixed opening member) 27, a drive motor 28, a photo interrupter 29a, and an FPC 29b. As shown in FIG. 3, the aperture unit 20 adjusts the amount of light passing through openings 21b, 22b, 23e, 24b, 25b, and 27b formed at the center of each of the substantially annular members by opening and closing the plurality of aperture blades 23 driven by the drive motor 28. The configuration is such that the centers of the openings 21b, 22b, 23e, 24b, 25b, and 27b and the opening in the aperture unit 20 substantially pass through the optical axis X.

Figure 4A:
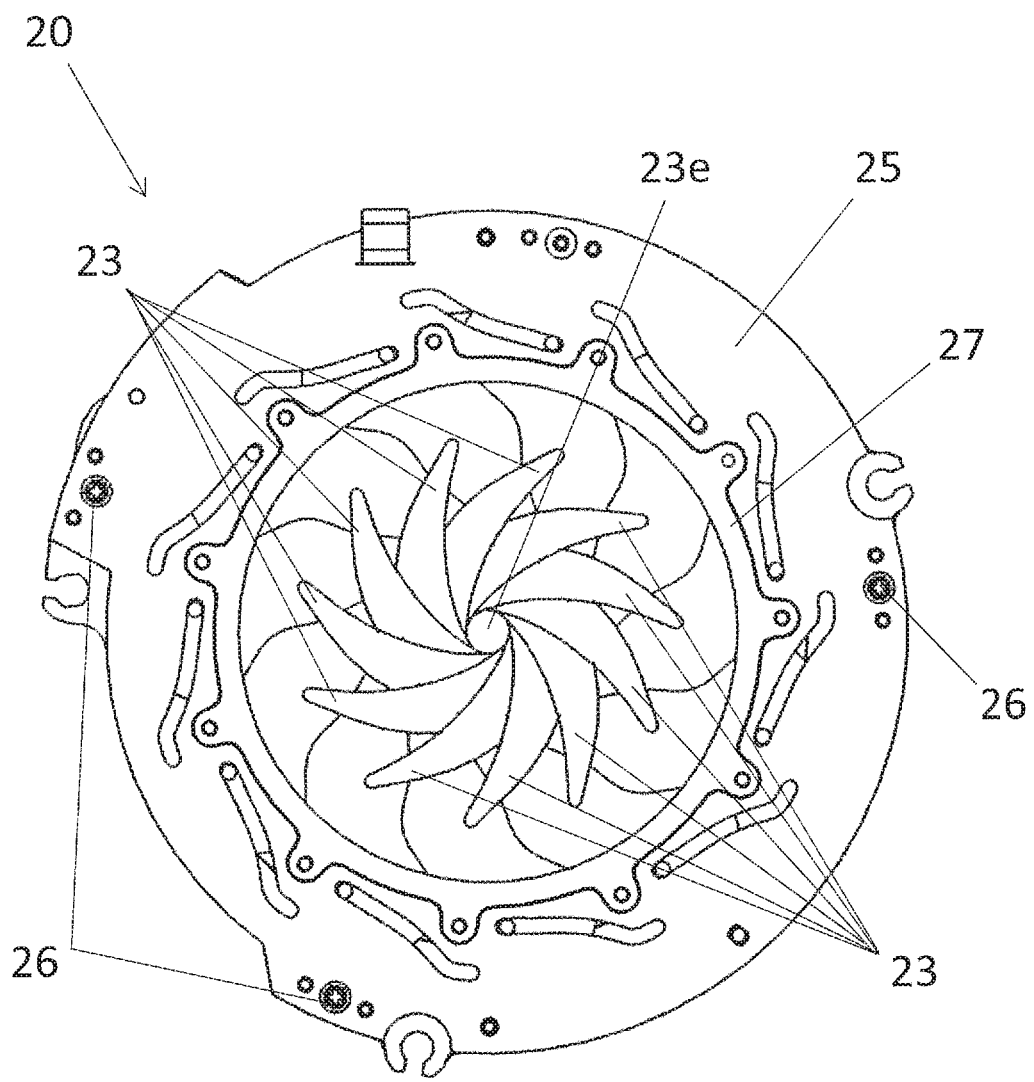
FIG. 4A is a diagram illustrating a state in which the aperture blades of the aperture unit in FIG. 3 have been constricted (a state in which the opening diameter is reduced), as viewed from the opposite side from subject side (cover side)

As shown in FIGS. 4A and 3B, in a state in which the aperture blades 23 are most constricted, the aperture unit 20 is in a state in which the opening diameter (surface area) of the opening 23e formed by the aperture blades 23 is at its smallest.

At this point, as shown in FIG. 4A, the aperture blades 23 are disposed such that the parts on the distal end side, as viewed on the opposite side from the subject side, that is, on the image plane side, overlap and are woven together in the circumferential direction around the optical axis X, that is, in a state of being warped upward.

Figure 4B:
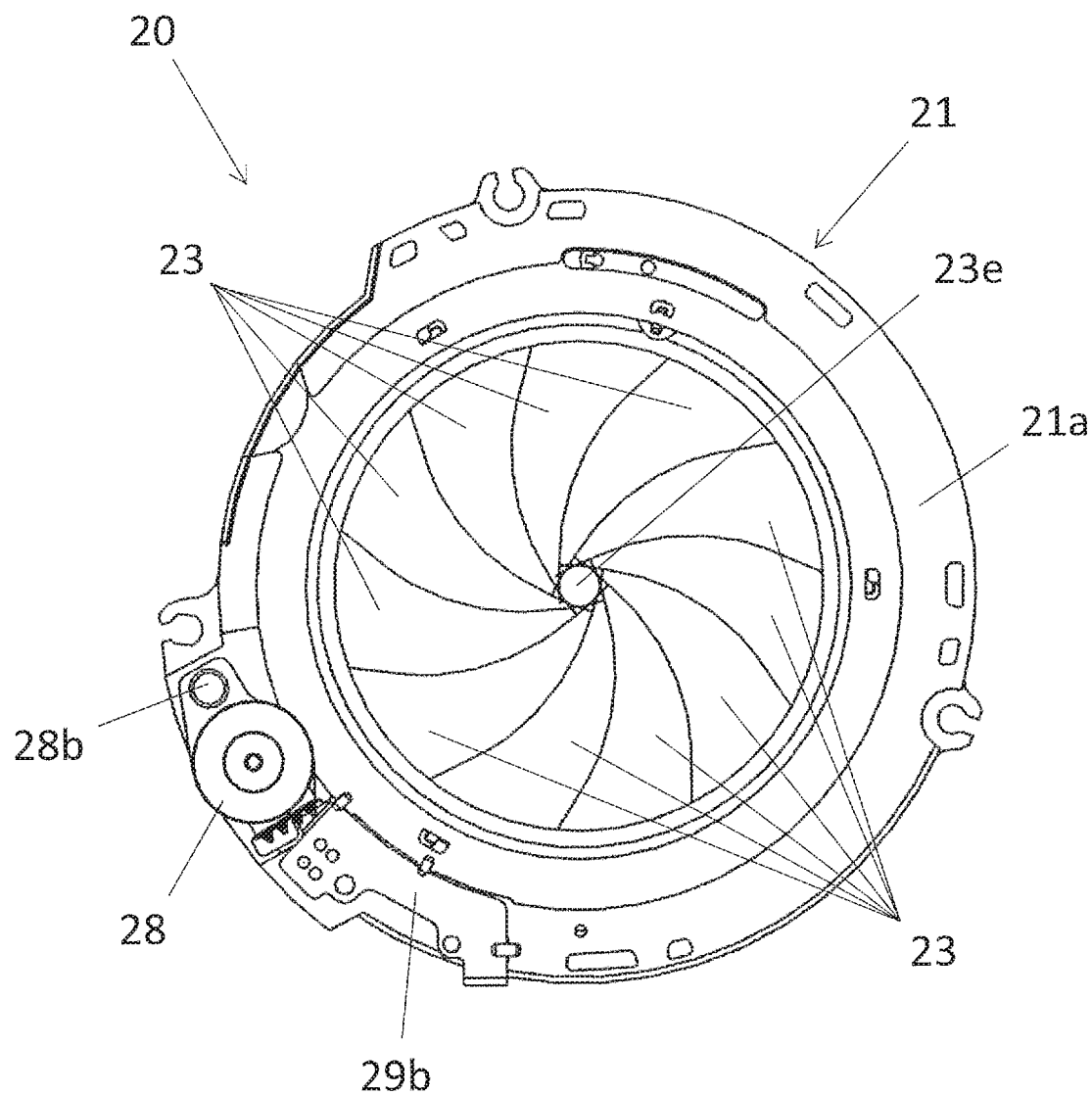
FIG. 4B is a diagram illustrating a state in which the aperture blades of the aperture unit in FIG. 3 have been constricted (a state in which the opening diameter is reduced), as viewed from the subject side (base plate side)
Figure 5A:
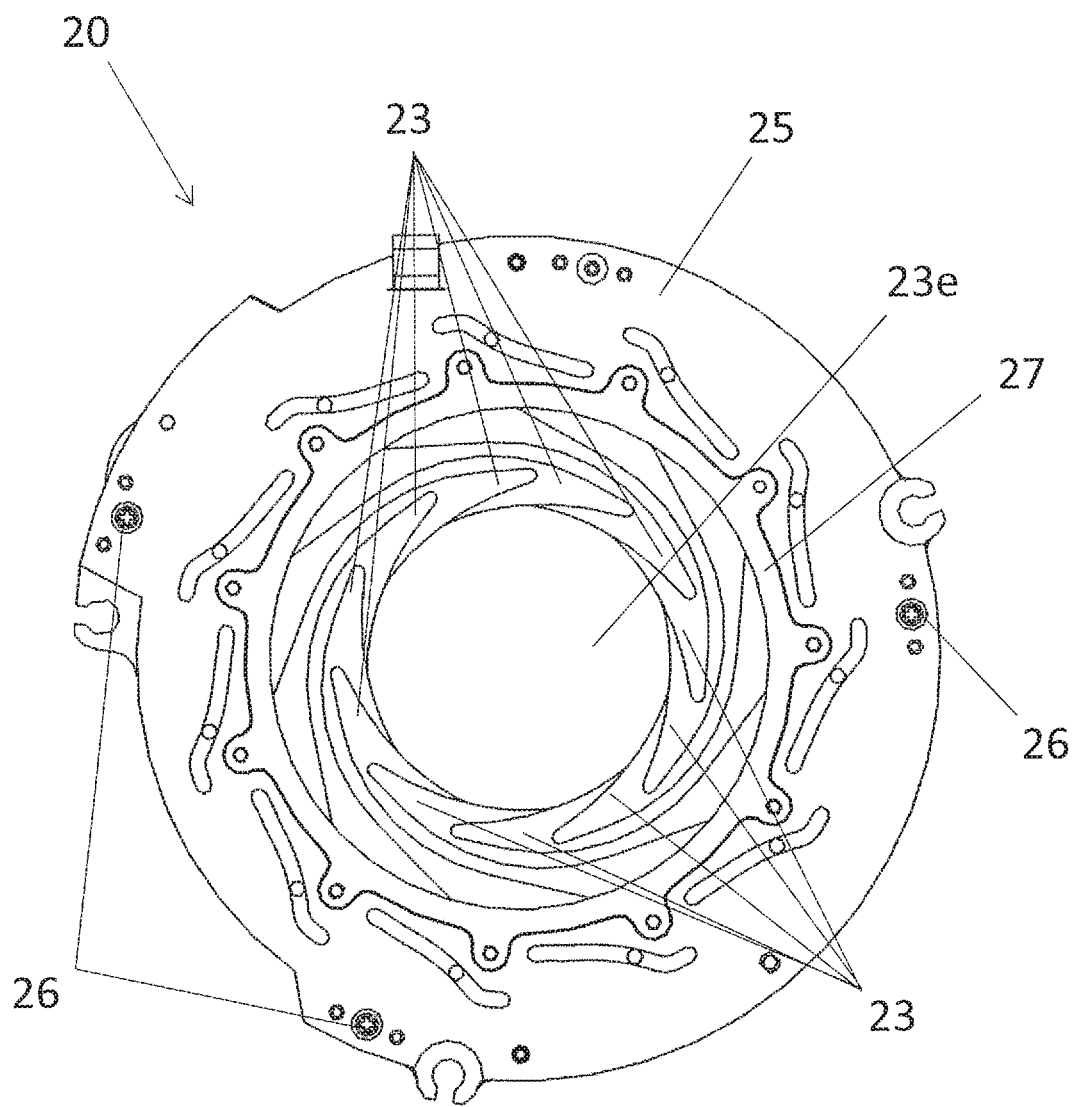
FIG. 5A is a diagram illustrating a state in which the aperture blades of the aperture unit in FIG. 4A are transitioning to a fully open state, as viewed from the opposite side from the subject side (cover side)
Figure 5B:
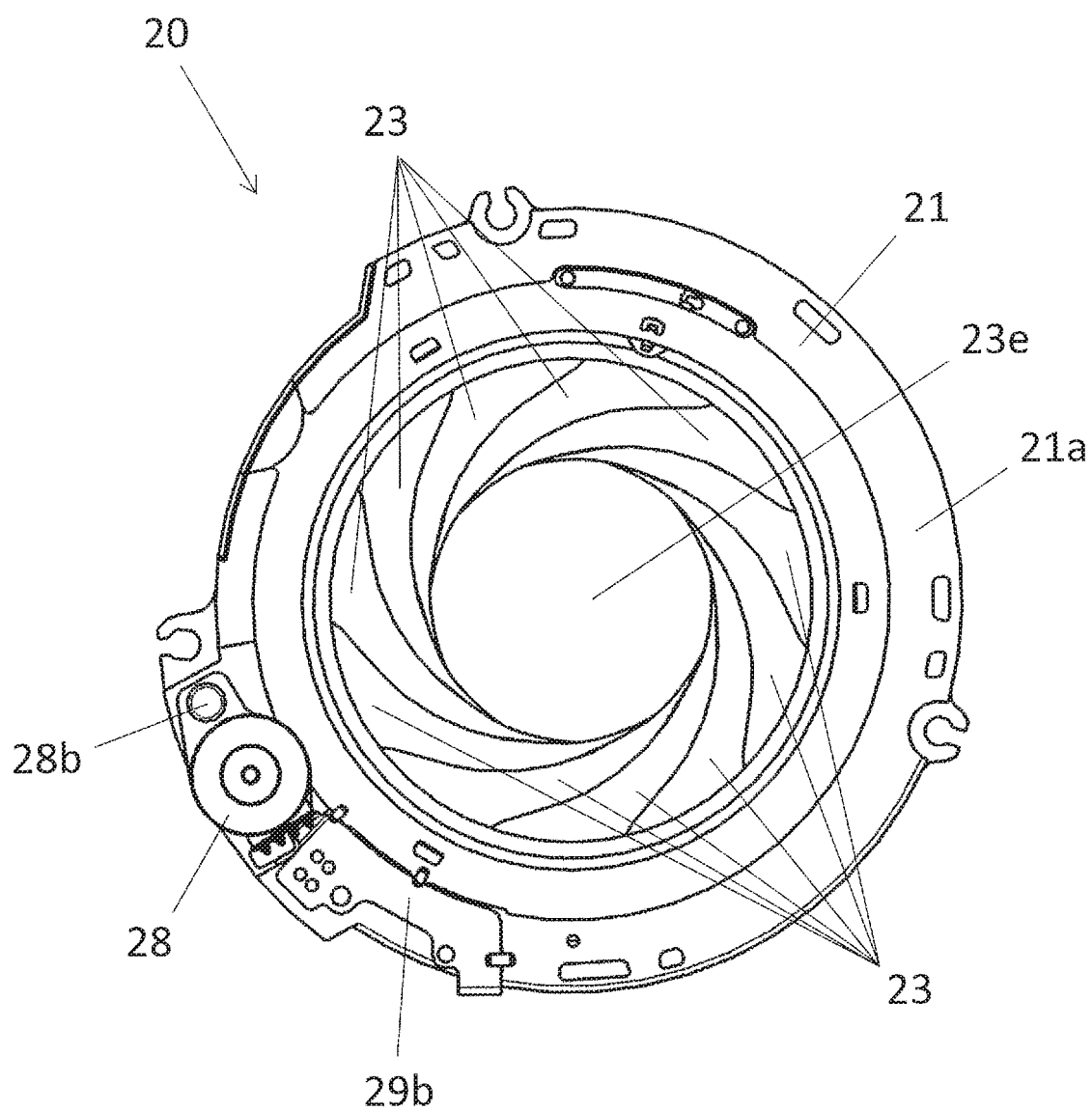
FIG. 5B is a diagram illustrating a state in which the aperture blades of the aperture unit in FIG. 4B are transitioning to a fully open state, as viewed from the subject side (base plate side)

When the aperture blades 23 are rotated from the state shown in FIGS. 4A and 4B, the opening diameter (surface area) of the opening 23e formed by the aperture blades 23 gradually increases as shown in FIGS. 5A and 5B.

Figure 6A:
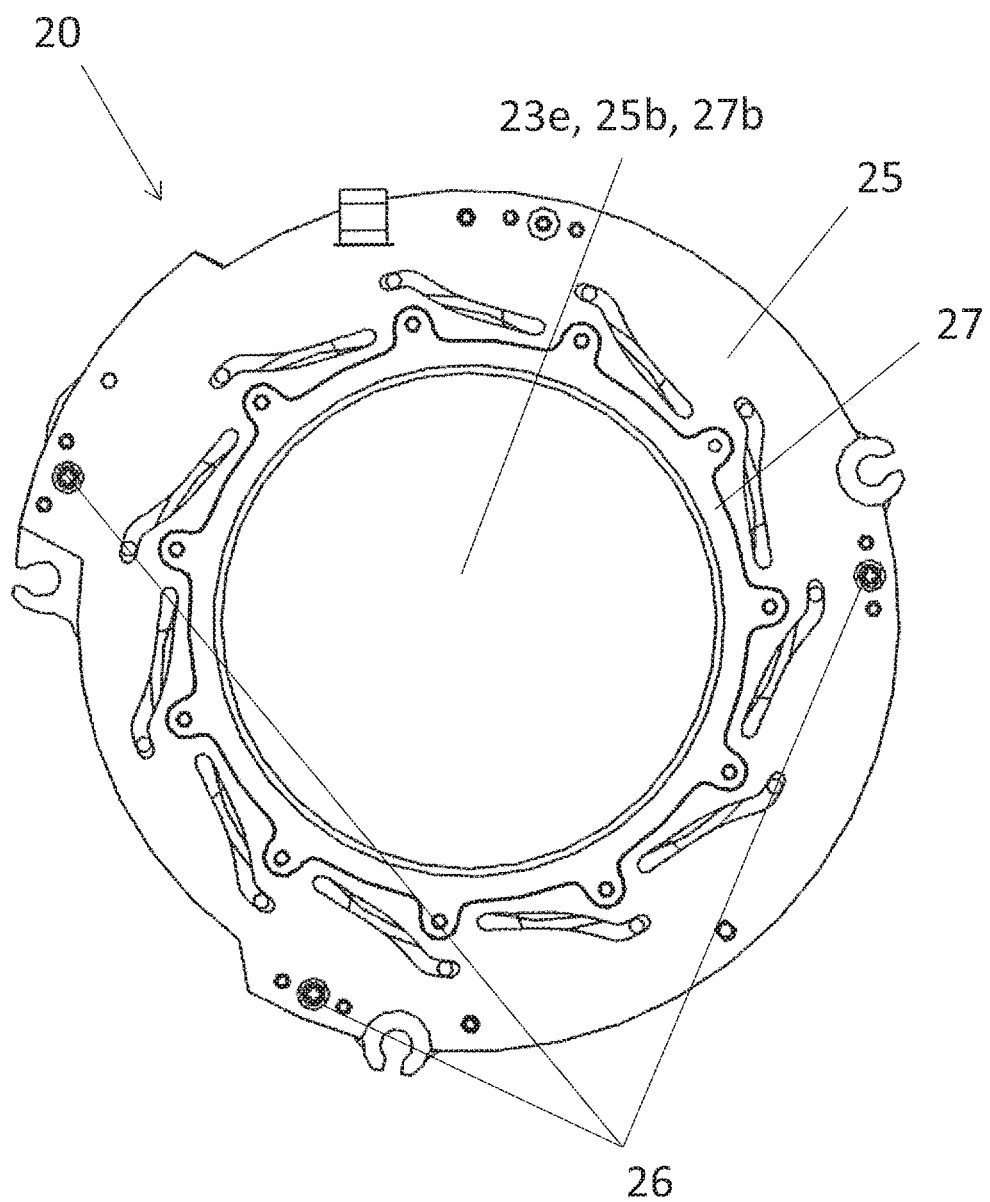
FIG. 6A is a diagram illustrating a state in which the aperture blades of the aperture unit in FIG. 4A have transitioned to a fully open state, as viewed from the opposite side from the subject side (cover side)
Figure 6B:
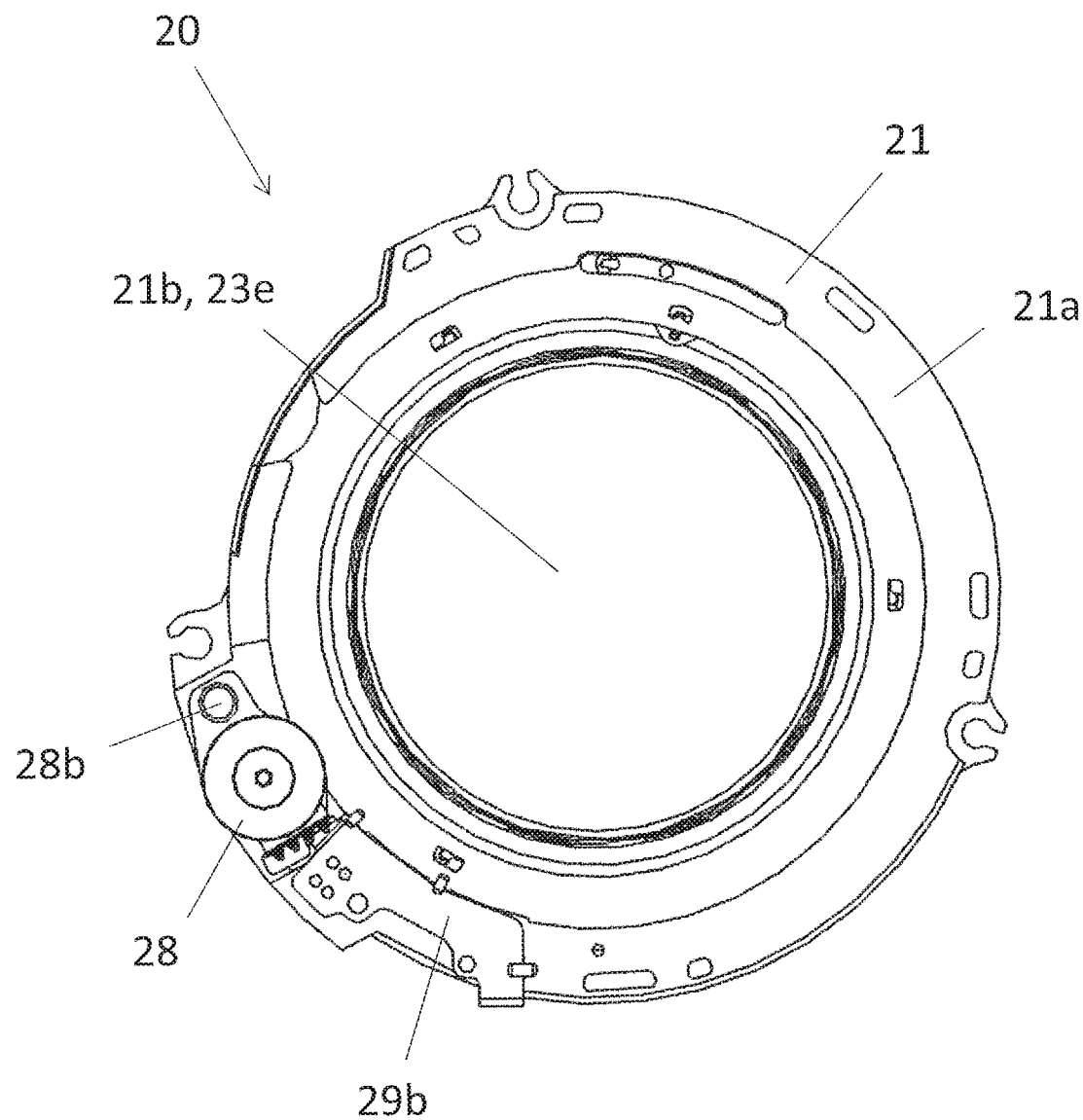
FIG. 6B is a diagram illustrating a state in which the aperture blades of the aperture unit in FIG. 4B have transitioned to a fully open state, as viewed from the opposite side from the subject side (base plate side)

When the aperture blades 23 are further rotated from the state shown in FIGS. 5A and 5B, as shown in FIGS. 6A and 6B, the aperture blades 23 go all the way into the gap between the base plate 21, the cover 25, etc., so that the opening diameter (surface area) of the opening 23e formed by the aperture blades 23 is at its largest.

In the state shown in FIGS. 6A and 6B in which the diameter or the surface area of the opening 23e is at its largest, the size of the open portion of the aperture unit 20 is defined by a fixed opening sheet 27 (discussed below). That is, the opening 27b of the fixed opening sheet 27 is constant and is smaller than the opening 23e of the aperture blades 23 having the largest opening diameter or surface area.

As described above, the aperture unit 20 in this embodiment can adjust the amount of light passing through the open portion by rotating the aperture blades 23 between the closed state shown in FIGS. 4A and 4B and the open state shown in FIGS. 6A and 6B.

Figure 16A:
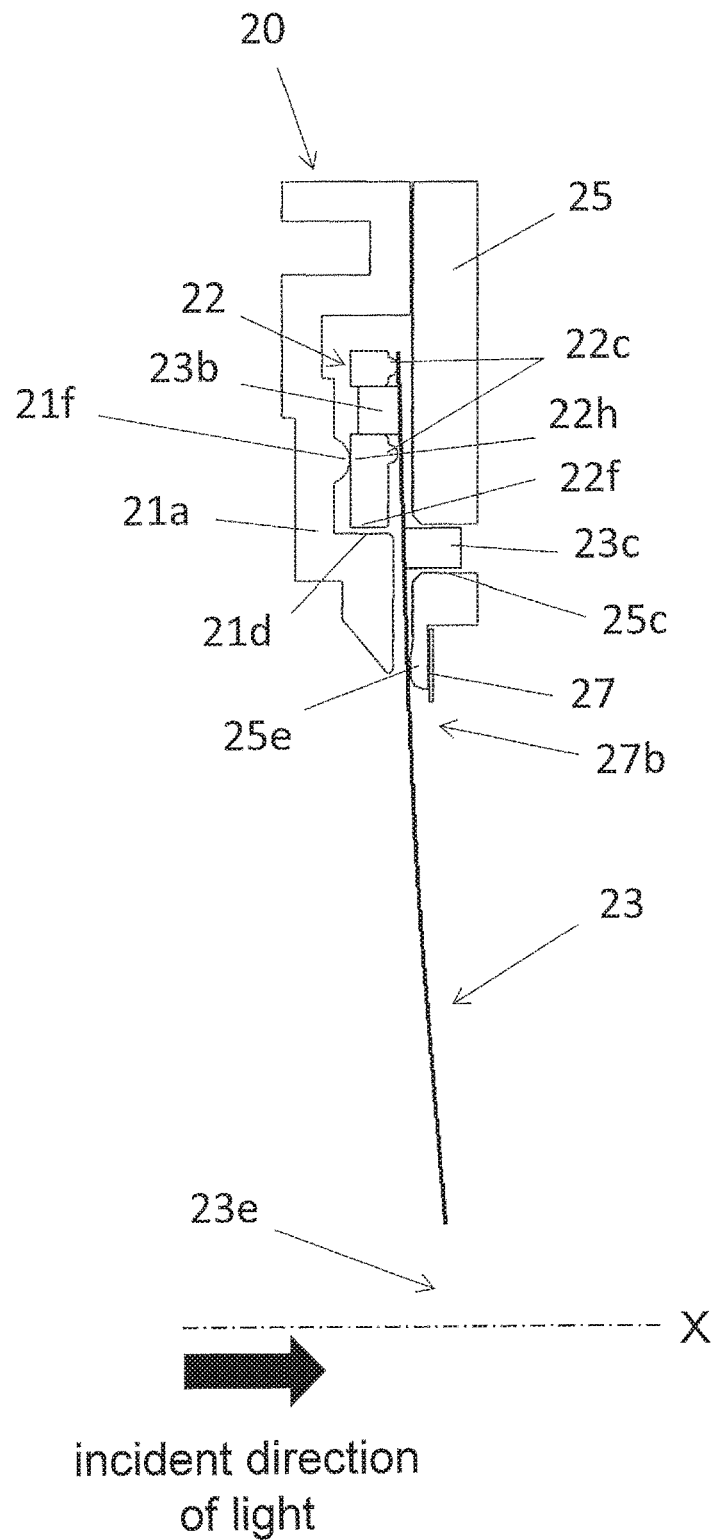
FIG. 16A is a detail cross section of the upper half in FIG. 15B.
Figure 19:
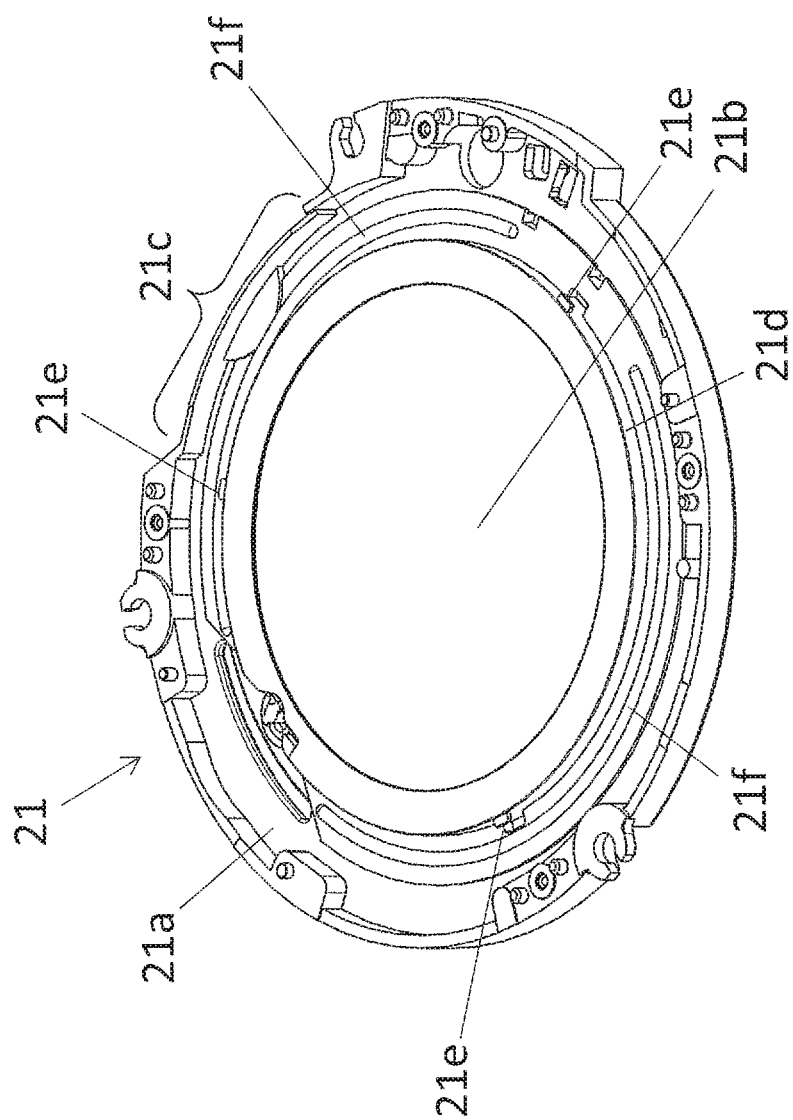
FIG. 19 is an oblique view of the configuration of a wall provided to the base plate constituting the aperture unit in FIG. 3.

As shown in FIG. 2, the base plate (first frame) 21 is a substantially annular member that is disposed closest to the subject in the light incident direction, and has a substantially annular main body 21a; an opening (first opening) 21b formed in the center portion of the main body 21a for transmitting light that is incident from the subject side; a wall (first wall) 21c (see FIG. 19); a radial restrictor 21d (see FIGS. 16A, 17A, and 19); a first optical axis direction restrictor 21e (see FIG. 19); and a second optical axis direction restrictor 21f (see FIGS. 16A, 17A, and 19). As shown in FIG. 2, the drive ring 22, the aperture blades 23, the sheet member 24, and the cover 25 are disposed in that order, starting from the subject side, between the base plate 21 and the fixed opening sheet 27 that is disposed the furthest downstream in the light incident direction.

Figure 7:
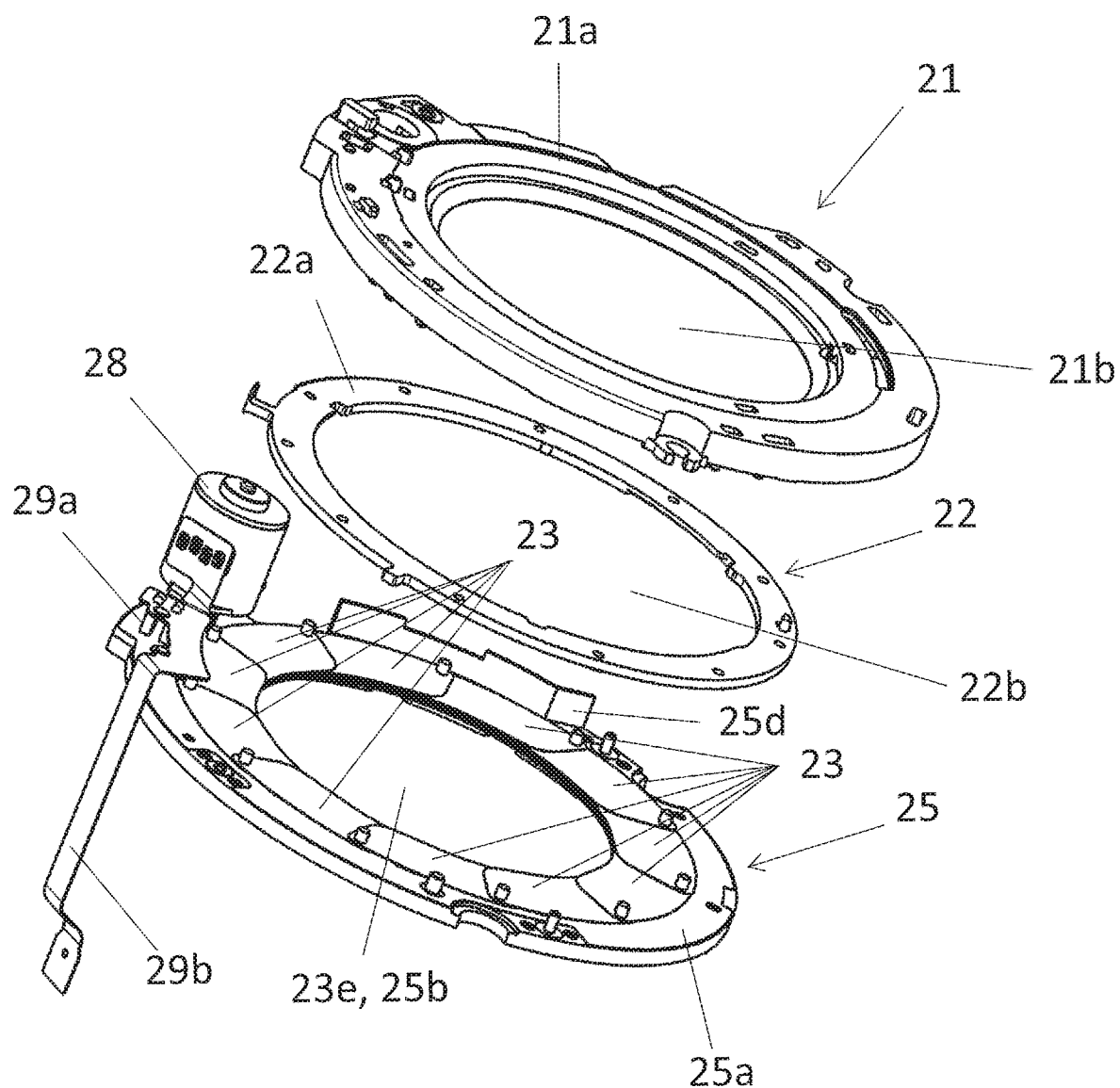
FIG. 7 is an exploded oblique view of a state in which the aperture blades of the aperture unit in FIG. 3 have transitioned to a fully open state.

As shown in FIGS. 3 and 7, a drive motor 28 or the like (discussed below) that is fixed to the base plate 21 is disposed on the surface on the subject side of the base plate 21 in order to impart a driving force for opening and closing the aperture blades 23.

As shown in FIGS. 2 and 7, the drive ring 22 is a substantially annular member disposed between the base plate 21 and the aperture blades 23 in the light incident direction.

Figure 8:
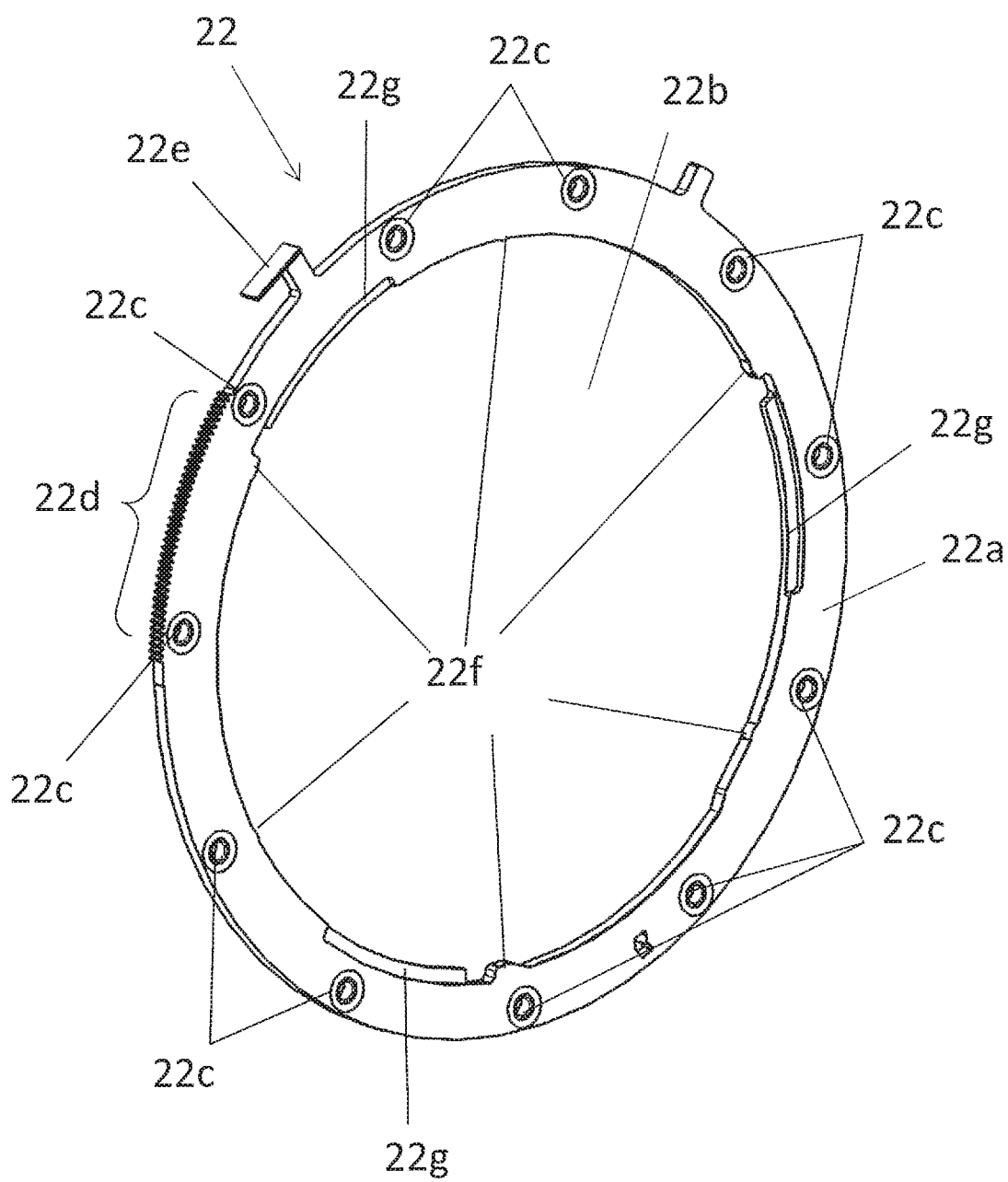
FIG. 8 is an oblique view of the configuration of a drive ring constituting the aperture unit in FIG. 3.
Figure 14:
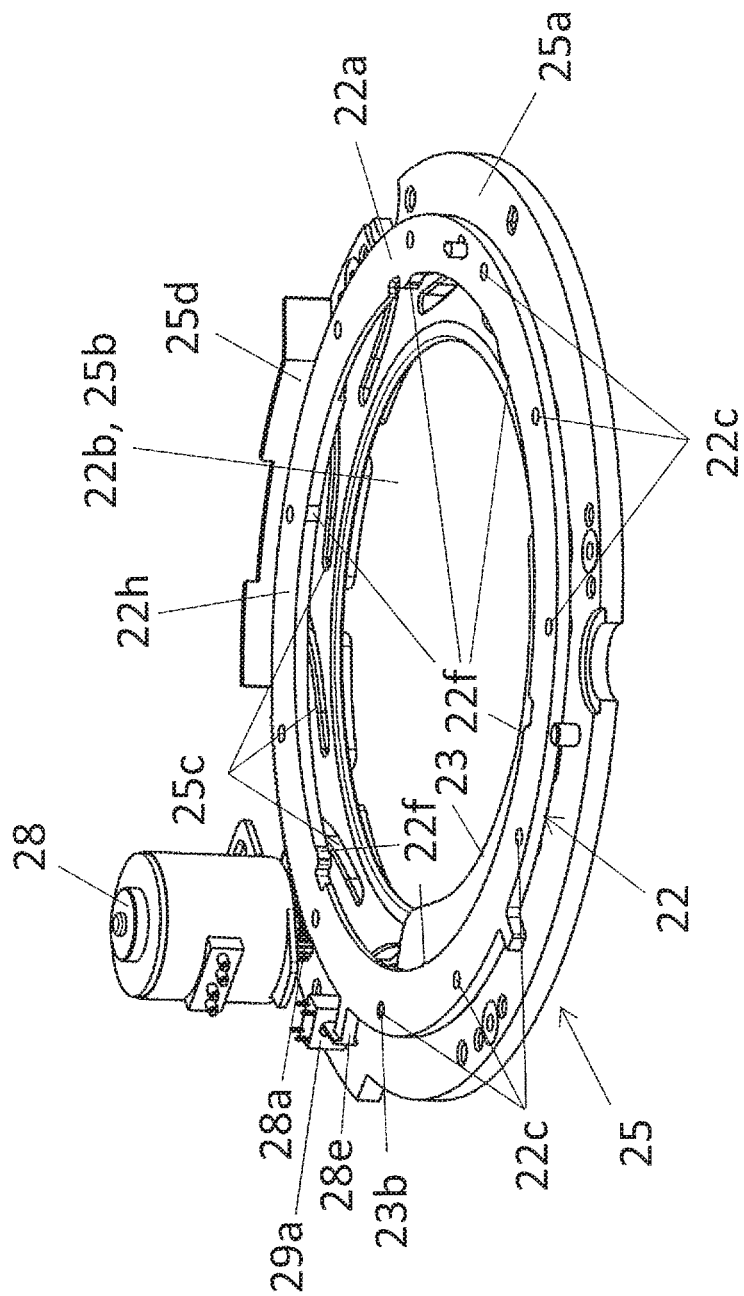
FIG. 14 is an oblique view showing a state in which one aperture blade, a drive ring, a photo interrupter, a gear, and a motor are assembled on the cover in FIG. 9.

More precisely, as shown in FIG. 8, the drive ring 22 has a substantially annular main body 22a, an opening 22b formed in the center thereof, a plurality of protrusions (supports, first supports) 22c, a gear 22d, a light blocker 22e, radial restrictors 22f (see FIGS. 8, 16A, and 17A), first optical axis direction restrictors 22g (see FIG. 8), and a second optical axis direction restrictor 22h (see FIGS. 14, 16A, and 17A). The drive ring 22 is rotated by the drive motor 28 (discussed below), causing the aperture blades 23 to rotate. More specifically, when the drive ring 22 transmits the drive force from the drive motor 28 (discussed below) via a gear 28a, the radial restrictors 22f of the drive ring 22 are restricted in their radial positions by the radial restrictor 21d of the base plate 21. Furthermore, the first optical axis direction restrictors 22g of the drive ring 22 hit the first optical axis direction restrictor 21e of the base plate 21, and the second optical axis direction restrictor 22h of the drive ring 22 hits the second optical axis direction restrictor 21f of the base plate 21.

Consequently, the drive ring 22 is sandwiched between the two optical axis direction restrictors 21e and 21f of the base plate 21, and therefore rotates around the optical axis X while its position in the optical axis direction is restricted. As a result, the drive ring 22 rotates the aperture blades 23 and adjusts the amount of light passing through the opening between the constricted and open states of the aperture blades 23, that is, between the minimum diameter and the maximum diameter.

As shown in FIG. 8, the main body 22a is a substantially annular plate-like member, and has an opening 22b formed at its center.

The opening 22b is an opening through which the light of the aperture unit 20 passes, and has a diameter or surface area substantially equal to or slightly larger than that of the opening 23e formed when the aperture blades 23 are fully opened. The opening 22b has a diameter or surface area substantially equal to or larger than the opening 27b in the fixed opening sheet 27 (discussed below).

As shown in FIGS. 8, 16a, 16b, 17a, and 17b, the protrusions 22c are provided on the surface of the main body 22a that is in contact with the surface on the opposite side from the direction of upward warpage of the aperture blades, and in this embodiment, eleven of these protrusions 22c are disposed at substantially equal angular intervals in the circumferential direction so as to protrude in an annular shape on the opposite side from the subject side (the cover 25 side), that is, from the surface on the image plane side. The protrusions 22c hit a part of the aperture blades 23 in the annular portion, and support the aperture blades 23 from the subject side. Also, through holes are formed in the approximate center of the annularly protruding portions of the protrusions 22c, and bosses 23b (first main shafts) of the aperture blades 23 (discussed below) are inserted into these holes.

The protrusions 22c (first supports) have a convex shape protruding from the surface of the drive ring 22 in the direction of the upward warpage of the aperture blades 23, and support the vicinity of the bosses 23b (first main shafts) of the aperture blades 23.

The protrusions 22c preferably have a substantially arced shape, a substantially elliptical shape, a substantially parabolic shape, a substantially multidimensional curve shape, or a gentle curved shape in a cross section that includes the center axis of the through holes or the bosses 23c (first main shafts).

With these configurations, the aperture blades 23 can be smoothly moved without an increase in the drive load due to abrasion or catching, and at the same time, upward warpage due to the weaving together of the aperture blades can be efficiently suppressed.

The gear 22d is formed on part of the outer peripheral surface of the main body 22a so as to mesh with the gear 28a (see FIGS. 2 and 14) attached to the rotation shaft of the drive motor 28. When the rotational drive force of the drive motor 28 is transmitted via the gear 28a, the gear 22d drives the drive ring 22 to rotate around the optical axis X.

The light blocker 22e is formed so as to protrude outward in the radial direction from a part of the outer peripheral surface of the main body 22a. When the drive ring 22 is rotationally driven to a certain position during the opening or closing of the aperture blades 23 (discussed below), the light blocker 22e is inserted between the light emitter and the light receiver of the photo interrupter 29a, and blocks the light emitted from the light emitter toward the light receiver (see FIG. 14). Consequently, information about the rotational position of the drive ring 22 is sensed by the photo interrupter 29a.

The aperture blades (movable blades) 23 are disposed downstream of the drive ring 22 in the light incident direction, as shown in FIG. 2. The aperture blades 23 rotate about the bosses 23b (first main shafts) (see FIG. 10) between the drive ring 22 and the sheet member 24, thereby varying the size (surface area) of the opening 23e (see FIG. 4A, etc.) and adjusting the amount of light that passes through the opening of the aperture unit 20.

Figure 9:
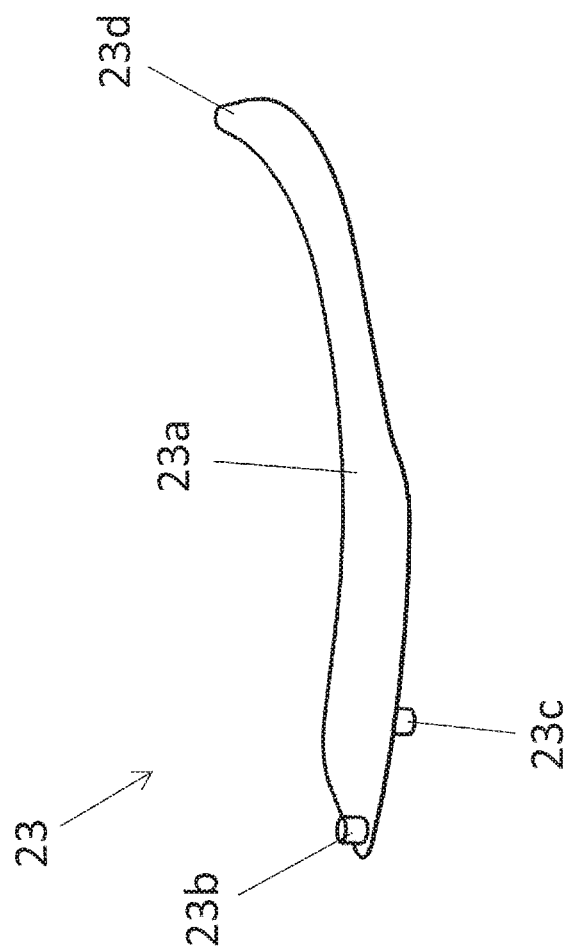
FIG. 9 is an oblique view of the configuration of an aperture blade constituting the aperture unit in FIG. 3.

More precisely, as shown in FIG. 9, the aperture blades 23 each have a main body 23a, a boss 23b (first main shaft), a boss 23c (first auxiliary shaft), and a distal end (free end) 23d.

As shown in FIG. 9, the main body 23a is a plate-like member formed in a blade shape, and is molded, for example, from LCP (liquid crystal polymer), PPS (polyphenylene sulfide), PA to (polyamide), or another such high-rigidity resin.

Because the aperture blades 23 are thus molded using a material having relatively high rigidity, the amount of upward warpage (discussed below) can be suppressed.

The bosses 23b (first main shafts) are provided so as to protrude from the upper surfaces (the surfaces facing the drive ring 22) at one end (the first end) of each main body 23a, and serve as rotation shafts when the aperture blades 23 rotate. The bosses 23b (first main shafts) are inserted into through-holes formed in the center of the protrusions 22c of the drive ring 22, as described above. Accordingly, the bosses 23b (first main shafts) move in the circumferential direction when the drive ring 22 is rotationally driven in the opening or closing of the aperture blades 23 (discussed below).

The bosses 23c (first auxiliary shafts) are provided so as to protrude from the surfaces of the main body 23a on the opposite side from the bosses 23b (first main shafts) (the surfaces facing the cover 25). The bosses 23c (first auxiliary shafts) are inserted into cam grooves 25c (see FIG. 10) formed in the cover 25 (discussed below). Accordingly, the bosses 23c (first auxiliary shafts) move while being guided by the cam grooves 25c when the drive ring 22 is rotationally driven and the aperture blades 23 move in the circumferential direction in the opening or closing operation of the aperture blades 23 (discussed below). Consequently, the amount of light that passes through the opening of the aperture unit 20 can be adjusted by varying the amount of rotation of the aperture blades 23 according to the amount of rotation of the drive ring 22, and thereby changing the surface area of the opening 23e formed by the aperture blades 23. When the drive ring 22 is rotationally driven, the relative positions of the bosses 23b (first main shafts) and the bosses 23c (first auxiliary shafts) with respect to the base plate 21 or the cover 25 change, the aperture blades 23 rotated around the bosses 23b (first main shafts), and the size of the opening of the aperture unit 20 changes.

The distal ends 23d are free ends provided on the other end (second end) side of the main body 23a, and when the aperture blades 23 rotate around the bosses 23b (first main shafts), these distal ends 23d either move out into the opening so as to cover the opening, or retract from the opening.

The configuration of the aperture blades 23 and the opening/closing mechanism for rotating these blades will be described in detail below. In this embodiment, eleven aperture blades 23 are provided, for example.

As shown in FIG. 2, the sheet member 24 is a substantially annular member disposed downstream of the aperture blades 23 in the light incident direction, and has a substantially annular main body 24a and an opening 24b formed in the center thereof. The sheet member 24 has through-grooves 24c of the same shape in the portion overlapping the cam grooves 25c (see FIG. 10) formed in the cover 25 disposed on the downstream side in the light incident direction.

Figure 10:
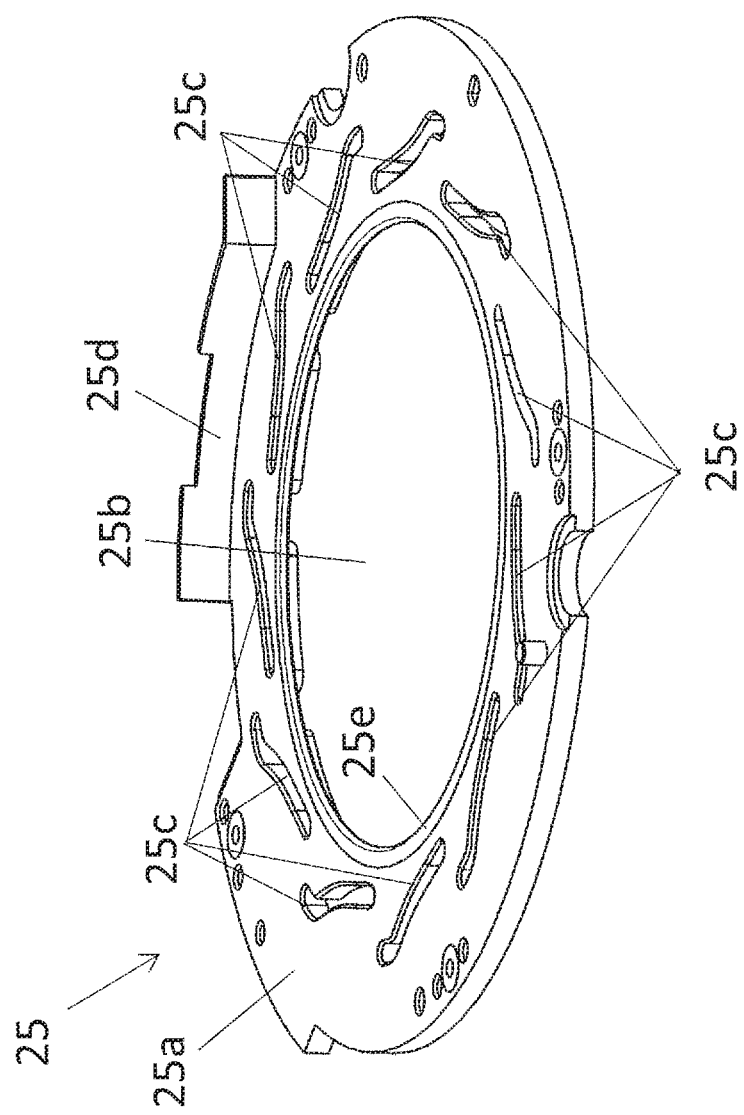
FIG. 10 is an oblique view showing the configuration of a cover constituting the aperture unit in FIG. 3.

As shown in FIG. 2, the cover (second frame) 25 is a substantially annular member disposed downstream of the sheet member 24 in the light incident direction, and as shown in FIG. 10, has a substantially annular main body 25a, an opening 25b, cam grooves 25c, a wall (second wall) 25d, and a protrusion (support, second support) 25e.

As shown in FIG. 10, the main body 25a is a substantially annular plate-shaped member, and has the opening 25b formed in its center.

The opening 25b is an opening through which the light of the aperture unit 20 passes, and has a surface area equal to or slightly larger than that of the opening 23e formed when the aperture blades 23 are fully opened.

The cam grooves 25c are guide grooves formed in the main body 25a, and the above-mentioned bosses 23c (first auxiliary shafts) of the aperture blade 23 are inserted therein. Therefore, the cam grooves 25c are formed in the same number as the aperture blades 23 (eleven in this embodiment). When the drive ring 22 is rotationally driven and the aperture blades 23 move in the circumferential direction, the bosses 23c (first auxiliary shafts) move along the cam grooves 25c, whereby each of the plurality of aperture blades 23 is rotated.

Figure 11:
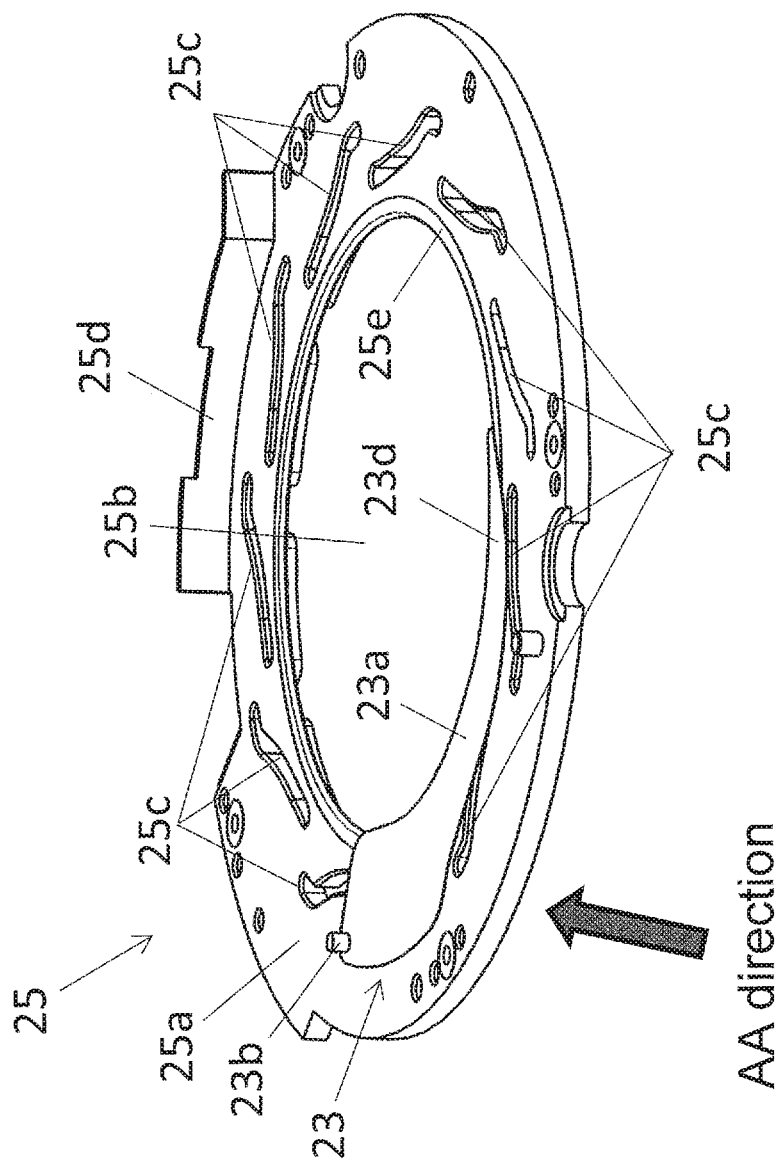
FIG. 11 is an oblique view showing a state in which one aperture blade is disposed on the cover in FIG. 10.
Figure 12:
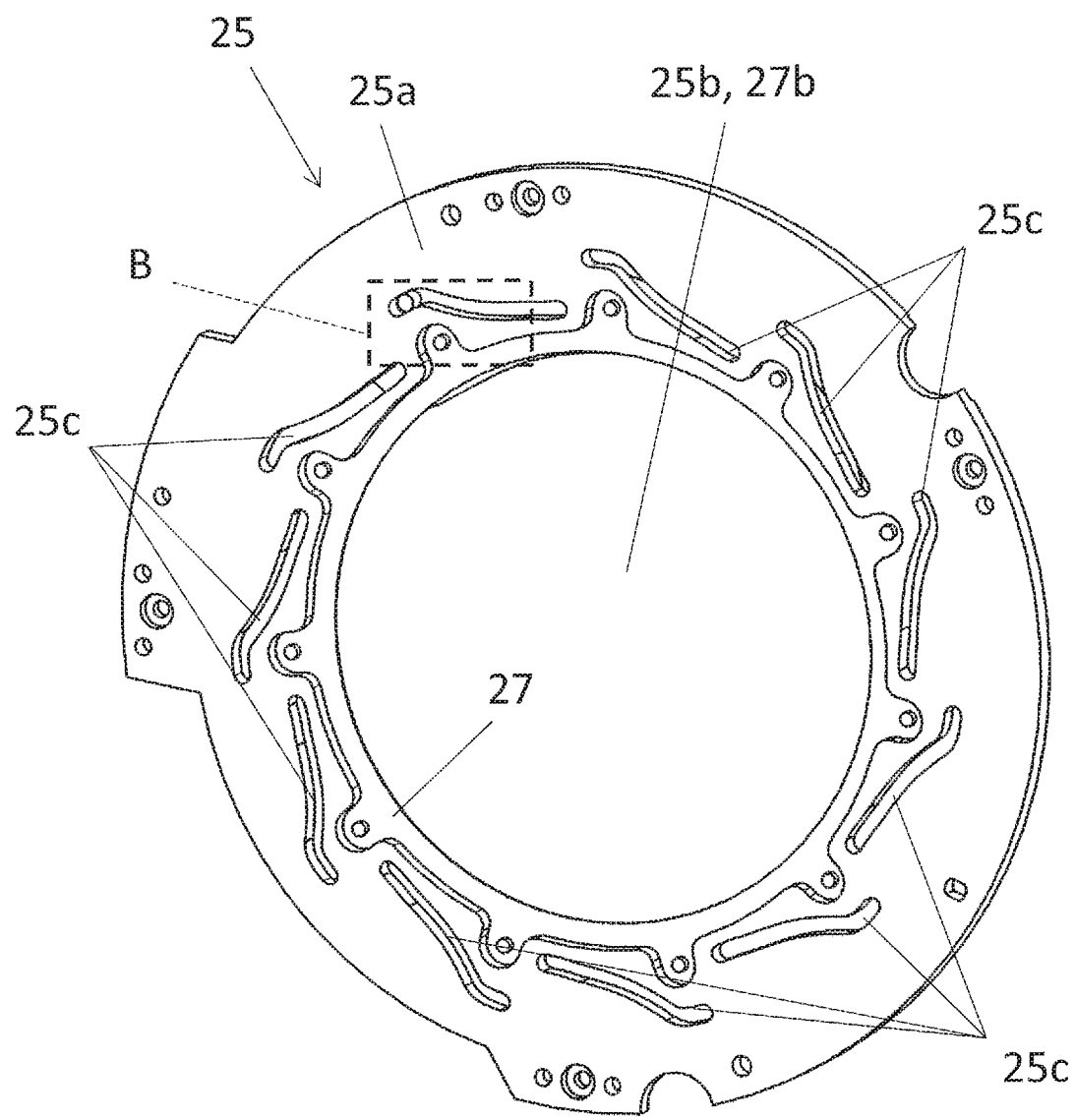
FIG. 12 is an oblique view as seen from the AA direction in FIG. 11.

FIG. 11 shows a state in which only one aperture blade 23 has been disposed with its boss 23c (first auxiliary shaft) inserted into the cam groove 25c, and FIG. 12 shows the state when FIG. 11 is viewed from the AA direction in the drawing. For the sake of simplicity, the sheet member 24 is not shown in FIG. 11.

Figure 13:
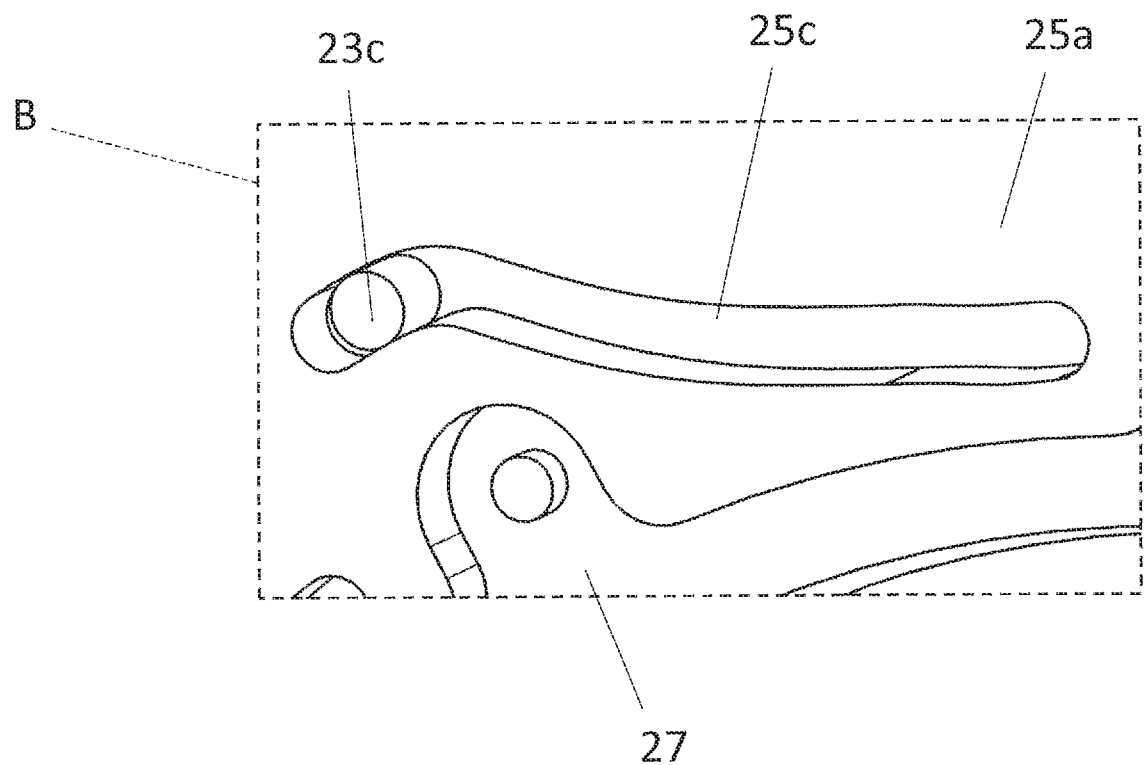
FIG. 13 is a detail view of the B portion in FIG. 12.

In this state, the boss 23c (first auxiliary shaft) is inserted into the cam groove 25c as shown in FIG. 13, which is a detail view of the B portion in FIG. 12, and moves along the cam groove 25c along with the rotation of the drive ring 22.

The wall 25d is a wall-shaped member disposed so as to cover a part of the outer peripheral portion of the main body 25a, and constitutes an oil intrusion prevention structure (discussed below) (see FIG. 20, etc.).

The protrusion 25e is an annular portion disposed on the inner peripheral side of the upper surface of the main body 25a (the surface facing the aperture blades 23 and the sheet member 24), and is formed to protrude from the upper surface of the main body 25a. The protrusion 25e formed in an annular shape is disposed substantially concentrically with the opening 25b. The protrusion 25e comes into contact with a part of the aperture blades 23, and supports the aperture blades 23 from the opposite side from the subject side.

More specifically, as shown in FIG. 11, the protrusion 25e is disposed at a position closer to the bosses 23b (first main shafts) serving as the rotation shafts of the aperture blades 23 disposed on the cover 25. The protrusion 25e supports the aperture blades 23 at a position closer to the bosses 23b (first main shafts) of the aperture blades 23.

In an open state in which the aperture blades 23 are accommodated in the gap between the base plate 21 and the cover 25, the protrusion 25e is disposed at a position where three aperture blades 23 overlap.

On the other hand, since the protrusions 22c on the drive ring 22 side are provided near the rotation shafts (the bosses 23b (first main shafts)) of the aperture blades 23, they are disposed at a position overlapping one aperture blade 23 regardless of the rotation position of the aperture blades 23.

Accordingly, the protrusion 25e is formed to have a lower protruding height than the protrusions 22c so that the three aperture blades 23 can move easily.

The protrusion 25e (second support) is formed on the cover (second frame) 25, and is located near the opening of the aperture unit 20 or the opening 25b (second opening) of the cover (second frame) 25. Furthermore, the protrusion 25e (second support) is located outside the opening 27b of the fixed opening sheet 27 that determines the opening diameter or opening surface area of the aperture unit 20 when the aperture blades 23 are fully open, that is, on the side away from the center of the opening.

Furthermore, the protrusion 25e (the second support) is provided so as to be located more to the center axis side of the opening of the aperture unit 20 or the opening 25b (the second opening) of the cover (second frame) 25, than the protrusions 22c (first supports) of the drive ring 22, and to be in contact with the surface on the same side as the direction of upward warpage of the aperture blades 23.

Furthermore, the protrusion 25e (second support) is provided in an annular shape with respect to the center axis of the opening of the aperture unit 20 or the opening 25b (second opening) of the cover (second frame) 25.

Furthermore, the protrusion 25e (second support) preferably has a substantially arced shape, a substantially elliptical shape, a substantially parabolic shape, a substantially multidimensional curve shape, or a gentle curved shape in a cross section that includes the center axis of the opening of the aperture unit 20 or the opening 25b (second opening) of the cover (second frame) 25.

With these configurations, the aperture blades 23 can be smoothly moved without an increase in the drive load due to abrasion or catching, and at the same time, upward warpage due to the weaving together of the aperture blades can be efficiently suppressed.

As shown in FIG. 4A, etc., three attachment screws 26 are provided in order to fix the cover 25 to the base plate 21 from the downstream side of the cover 25 in the light incident direction as shown in FIG. 2.

As shown in FIG. 2, the fixed opening sheet (fixed opening member) 27 is disposed on the downstream side of the cover 25, that is, the furthest downstream from the aperture unit 20, in the light incident direction. The fixed opening sheet 27 has a substantially annular main body 27a and an opening 27b formed in the center portion of the main body 27a, and is provided in order to define the diameter or surface area of the opening when the aperture unit 20 is in its fully open state. The fixed opening sheet 27 is fixed to the surface of the cover 25 on the opposite side from the subject side.

The drive motor 28 is fixed to the base plate 21 by an attachment screw 28b (see FIGS. 2 and 4A) in order to impart a drive force to the aperture blades 23 when performing the opening and closing of the aperture blades 23. The drive motor 28 is electrically connected to an FPC 29b (discussed below), and its rotation shaft is rotated by power supplied from an electrical circuit (not shown).

More specifically, the drive motor 28 rotates the gear 28a press-fitted to the rotation shaft, and thereby rotates the drive ring 22 around the optical axis X via the gear 22d disposed so as to mesh with the gear 28a.

The photo interrupter 29a has a light emitter and a light receiver, and is provided in order to sense the rotational position of the drive ring 22. The photo interrupter 29a is attached to the upper surface of the cover 25 (the surface on the subject side) as shown in FIG. 14.

The FPC 29b is a flexible printed circuit board, and as shown in FIGS. 2 and 3, electrically connects the photo interrupter 29a and the drive motor 28, and is connected to an electric circuit (not shown) via a connector. The FPC 29b is attached to the upper surface of the base plate 21 (the surface on the subject side), as shown in FIGS. 3 and 4.
Opening/Closing Mechanism of Aperture Blades 23

The mechanism for opening and closing the eleven aperture blades 23 in the aperture unit 20 of this embodiment will now be described.

As described above, the aperture unit 20 in this embodiment rotates the eleven aperture blades 23 around their respective bosses 23b (first main shafts), thereby changing the surface area of the opening 23e formed in the center portion of the eleven aperture blades 23.

More specifically, the bosses 23b (first main shafts) of the eleven aperture blades 23 are inserted into the through-holes in the centers of the protrusions 22c formed on the drive ring 22. Meanwhile, the bosses 23c (first auxiliary shafts) of the aperture blades 23 are inserted into the cam grooves 25c formed in the cover 25, as shown in FIGS. 12 and 13.

Here, when the bosses 23c (first auxiliary shafts) are in the position shown in FIG. 13, the aperture blades 23 are in their open state in which the opening 23e is the largest, as shown in FIGS. 6A and 6B. Then, as the bosses 23c (first auxiliary shafts) move to the right along the cam grooves 25c shown in FIG. 13, the distal ends 23d of the aperture blades 23 rotates inward in the radial direction, and the surface area or the diameter of the opening 23e steadily decreases as shown in FIGS. 5A and 5B. When the bosses 23c (first auxiliary shafts) move to the vicinity of the right ends of the cam grooves 25c, the aperture blades 23 transition to a constricted state (closed state) in which the opening 23e is the smallest, as shown in FIGS. 4A and 4B.

The drive ring 22 is rotated around the optical axis X when the rotational drive force of the drive motor 28 is transmitted to the gear portion 22d via the gear 28a. Rotational position information about the drive ring 22 is sensed when the light blocker 22e provided integrally to the outer peripheral portion of the drive ring 22 passes through the photo interrupter 29a. This allows for adjustment of the opening diameter or opening surface area of the opening 23e of the aperture blades 23.

As shown in FIG. 14, the drive ring 22 is rotationally driven by the drive motor 28 in a state in which the bosses 23c (first auxiliary shafts) of the aperture blades 23 are inserted into the cam grooves 25c of the cover 25, and the bosses 23b (first main shafts) into the through-holes of the drive ring 22, there is movement in the circumferential direction along with the drive ring 22, and the rotation matches the movement of the bosses 23c (first auxiliary shafts) along the cam grooves 25c, with the bosses 23b (first main shafts) serving as the rotation shafts.

This allows the surface area or the diameter of the opening 23e formed by the aperture blades 23 to be adjusted smaller or larger.
Structure for Suppressing Upward Warpage of Aperture Blades 23

Figure 15A:
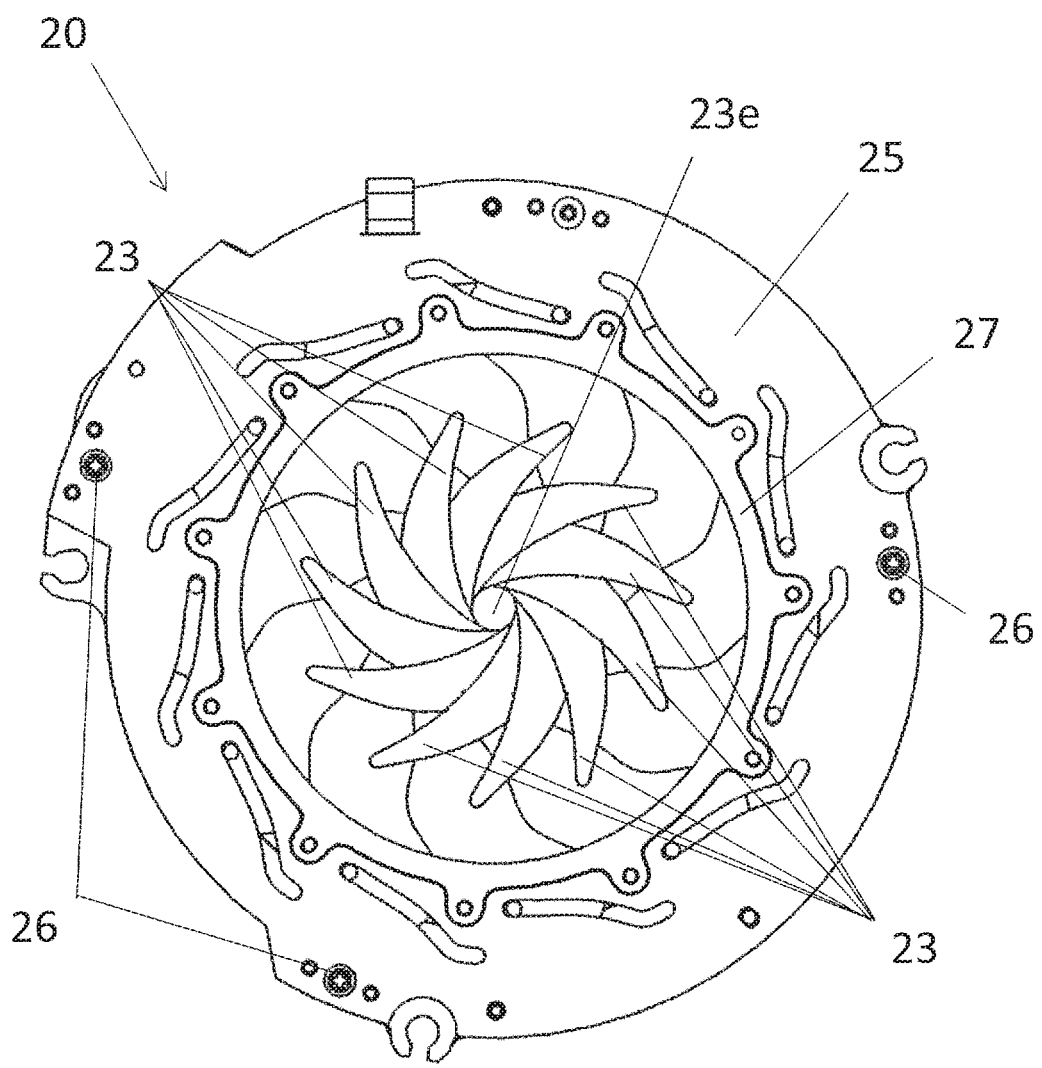
FIG. 15A is a diagram illustrating a state in which the aperture blades of the aperture unit in FIG. 3 are constricted (a state in which the opening diameter is reduced)

The aperture unit 20 in this embodiment comprises an upward warpage suppression structure in order to suppress upward warpage to the side on which the distal ends 23d of the aperture blades 23 are woven together when the aperture blades 23 are closing, as shown in FIG. 15A. This upward warpage suppression structure will now be described with reference to FIGS. 15A to 16B.

Figure 15B:
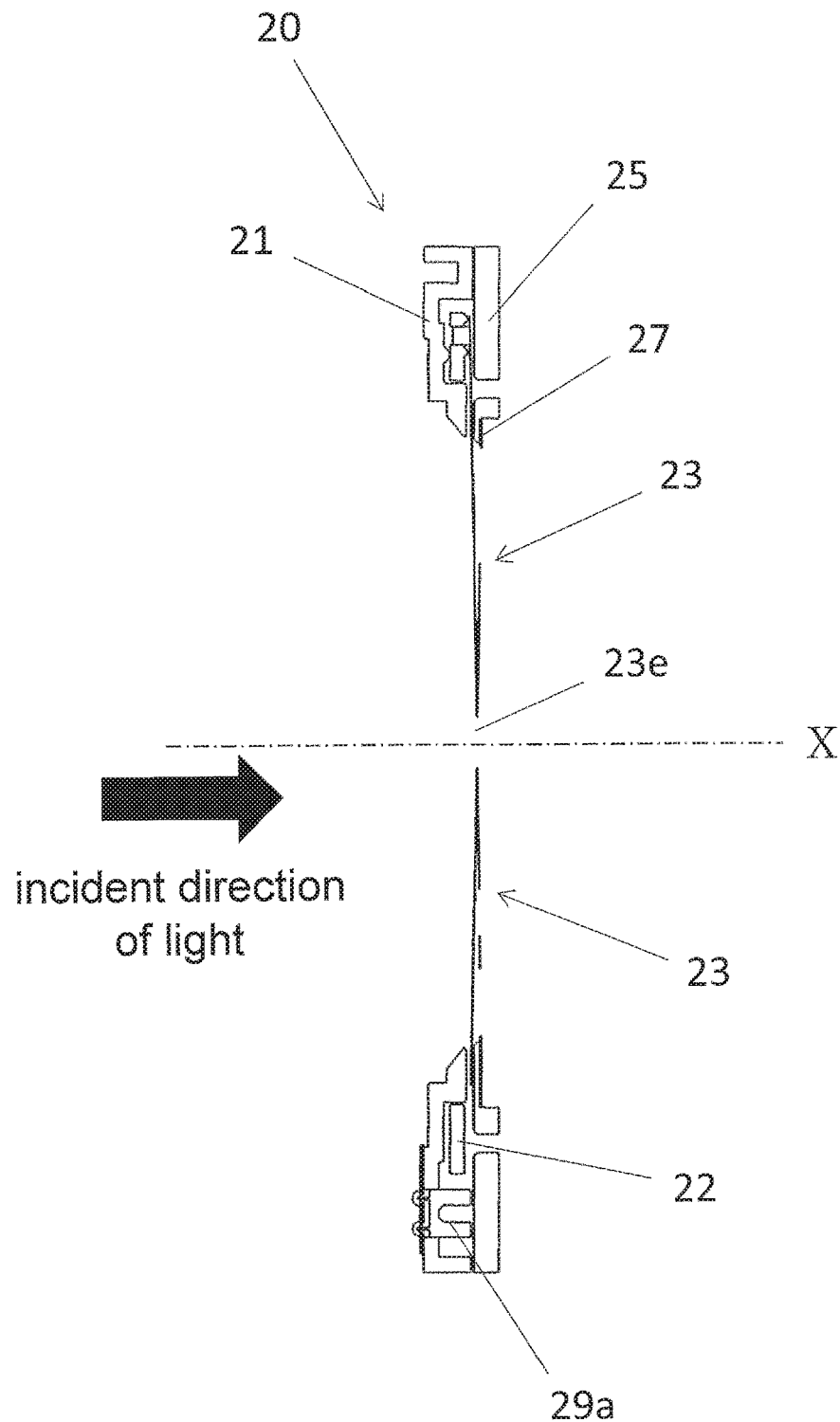
FIG. 15B is a cross section of the aperture unit in FIG. 15A.

As shown in FIGS. 15A and 15B, the aperture blades 23 undergo upward warpage to the image plane side such that the woven-together portions of the distal ends 23d of the aperture blades 23 rise up as the opening diameter constricts.

At this point, if the aperture blades 23 are in such a warped state, there is the risk, for example, that they may come into contact with the lens L5 or the like disposed opposite from them, and that this will leave a contact mark on the lens L5 or the like. Furthermore, there is the risk that this upward warpage will cause the center position of the opening 23e formed by the aperture blades 23 to shift, and that the position on the optical axis X will be shifted, the result being that the designed optical performance cannot be exhibited.

In view of this, the aperture unit 20 in this embodiment comprises a structure for suppressing the upward warpage of the aperture blades 23 with a simple configuration, without increasing the number of parts.

Figure 16B:
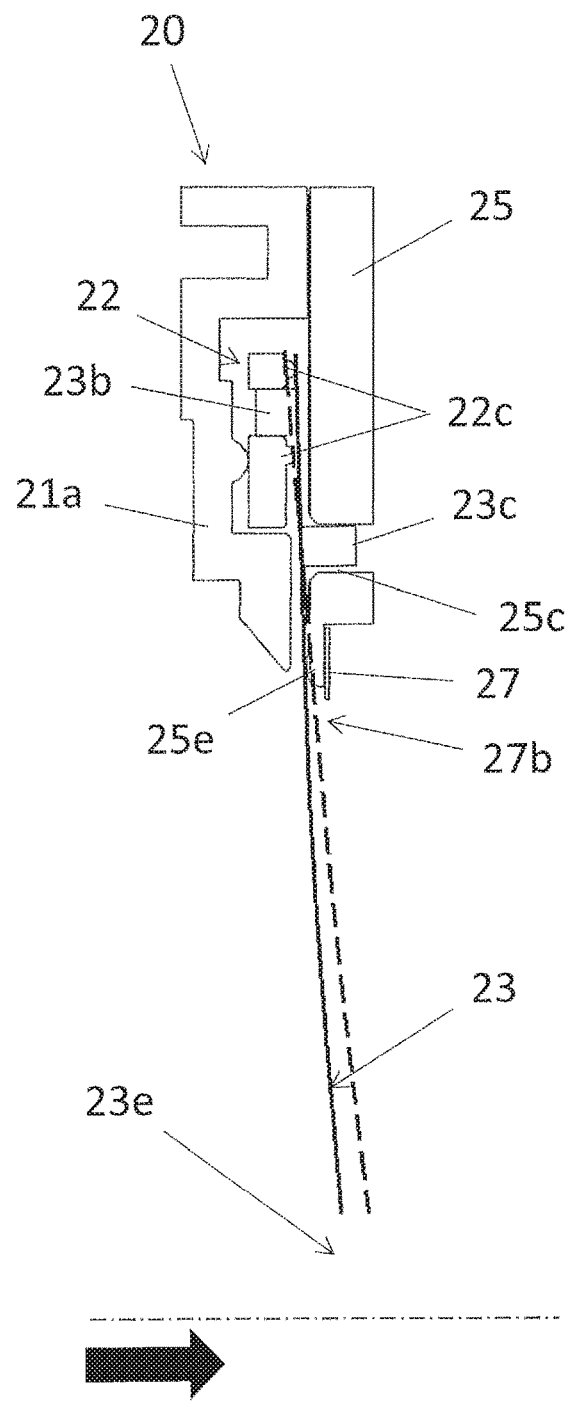
FIG. 16B is a cross section comparing the upward warpage of the aperture blades of the aperture unit in this embodiment (solid line) with the upward warpage of the aperture blades of a conventional aperture unit (broken line)

More specifically, as shown in FIGS. 16A and 16B, in the upward warpage suppression structure of this embodiment, the two protrusions 22c and 25e are disposed on the surface of the ring 22 and the cover 25 facing the aperture blades 23, in order to suppress upward warpage when the aperture blades 23 are woven together.

The protrusions 22c and 25e are disposed on the drive ring 22 and the cover 25, respectively, so as to hit part of the aperture blades 23. The protrusions 22c and 25e respectively support the aperture blades 23 in the direction of suppressing upward warpage when the aperture blades 23 are woven together.

As mentioned above, eleven protrusions 22c, the same number as that of the aperture blades 23, are provided on the surface of the drive ring 22 facing the aperture blades 23. The protrusions 22c are disposed around all the holes into which the bosses 23b (first main shafts) of the eleven aperture blades 23 are inserted. As shown in FIG. 16A, the protrusions 22c support the vicinity of the bases of the aperture blades 23 (the vicinity of the bosses 23b) from the subject side.

As described above, the protrusion 25e is provided in an annular shape on the surface of the cover 25 facing the aperture blades 23. As shown in FIG. 16A, the protrusion 25e supports the portions near the center of the aperture blades 23, on the opposite side from the subject side.

Consequently, in a state in which the aperture blades 23 have constricted (a state in which the opening diameter is reduced), the aperture blades 23 can hit the protrusions 22c and 25e to restrict deformation of the aperture blades 23.

Thus, with the configuration of the aperture unit 20 (solid line) in this embodiment, the amount of upward warpage of the aperture blades 23 toward the downstream side can be suppressed more effectively as compared to the aperture blade position in a configuration in which the protrusions 22c and 25e are not provided, as shown by the broken line in FIG. 16B.

As a result, it is possible to prevent problems attributable to the fact that the distal ends 23d of the aperture blades 23 hit the lens L5 or the like disposed downstream of the aperture unit 20 in the light incident direction.

Figure 20:
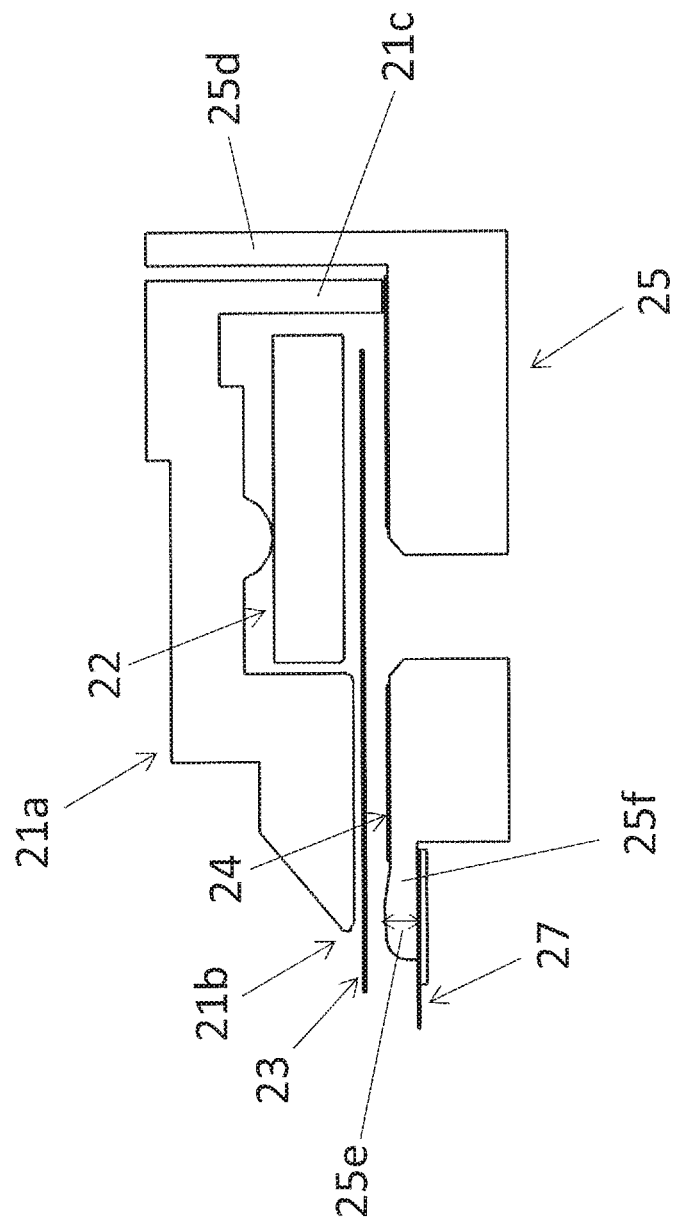
FIG. 20 is a cross section schematically showing a staggered structure of a wall for preventing oil from entering the aperture unit in FIG. 3, and the configuration of a fixed opening sheet, the aperture blades, and the cover.

Furthermore, with the aperture unit 20 in this embodiment, as shown in FIG. 17A, a spacer 25f (part of the cover 25) is provided between the aperture blades 23 and the fixed opening diameter of the aperture unit 20 defined by the fixed opening sheet 27 (see FIG. 20). That is, the fixed opening sheet 27 that defines the fixed opening diameter of the aperture unit 20 is disposed so that a part of the cover 25 and the spacer 25f are sandwiched between the aperture blades 23 and the fixed opening sheet 27.

Here, as shown in FIG. 17A, the amount of upward warpage of the aperture blades 23 increases as the aperture blades 23 are rotated in the direction of constriction, toward the downstream side in the light incident direction, that is, toward the weaving side.

Figure 17B:
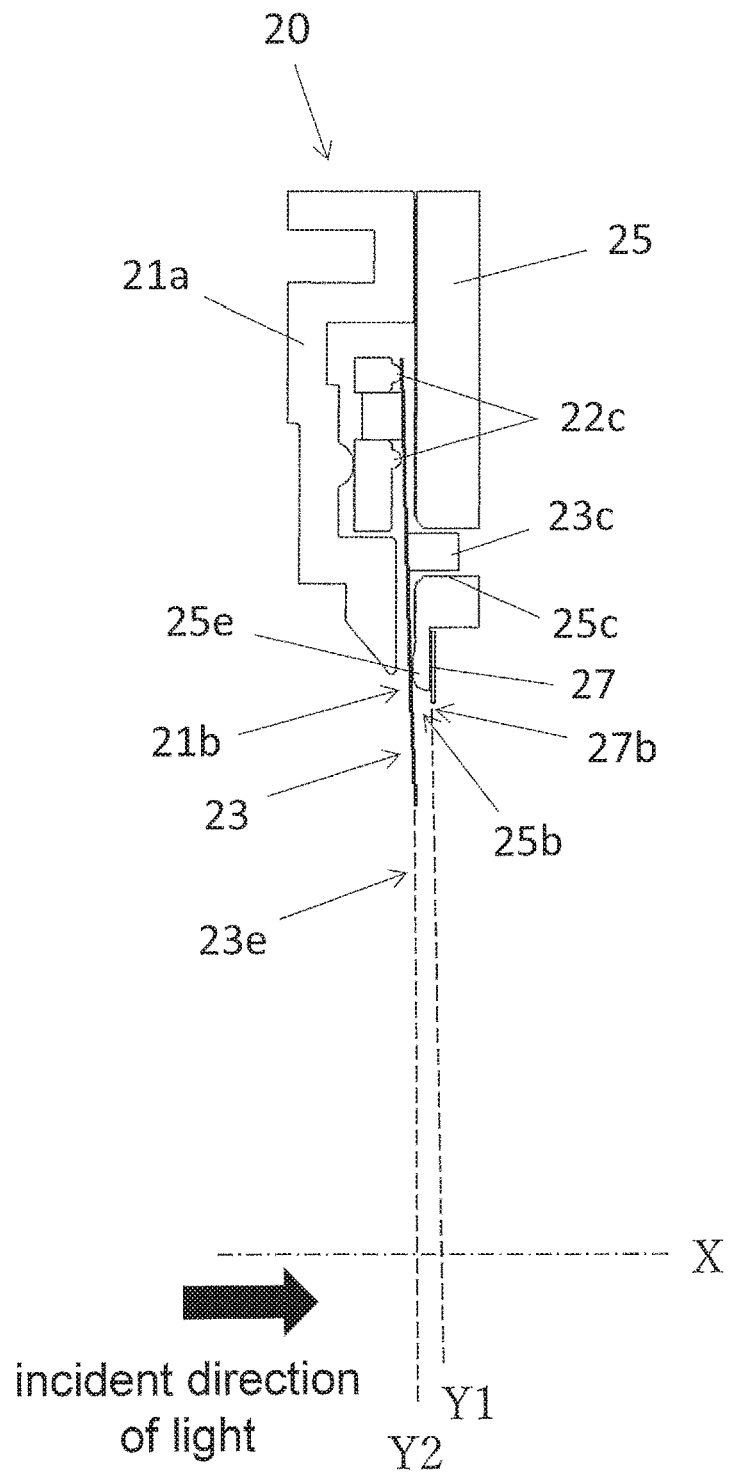
FIG. 17B is a cross section illustrating a state in which the aperture blades of the aperture unit in FIG. 17A have transitioned to an open state.

Thus, as the warped portions of the aperture blades 23 are rotated from the substantially open state shown in FIG. 17B in the direction in which the aperture blades 23 are constricted, as shown in FIG. 17A, there is movement to a position beyond the extension line Y2 to the inside in the radial direction of the protrusion 25e (second support) of the cover 25, and beyond the extension line Y1 to the inside in the radial direction of the fixed opening sheet 27 (fixed opening diameter). At this point, the aperture blades 23 come into contact with the protrusion 25e, and the position in the optical axis X direction is restricted.

As described above, with the aperture unit 20 in this embodiment, when the aperture blades 23 are in a substantially open state as shown in FIG. 17B, they are disposed upstream in the light incident direction from the position of the fixed opening diameter defined by the fixed opening sheet 27. As the aperture blades 23 then rotate in the direction of constricting, as shown in FIG. 17A, the distal end portions 23d of the aperture blades 23 warp upward toward the downstream side in the light incident direction, and go beyond the position of the fixed opening diameter (extension line Y1).

Consequently, from the state in which the opening 23e formed by the aperture blades 23 is at its largest to the state in which the opening 23e is at its smallest (FIG. 17A), the opening 23e of the aperture blades 23 can be disposed near the position of the extension line Y1 of the fixed opening diameter defined by the fixed opening sheet 27 in the light incident direction.

When the aperture blades 23 move in the direction of reducing the size of the opening 23e (third opening), the aperture blades 23 are moved in the same direction as the upward warpage so as to go beyond the imaginary plane constituting the opening 27b formed by the movable opening sheet 27 (fixed opening member) as the amount of upward warpage increases.

When the aperture blades 23 are in the fully opened state of the opening 23e (third opening), the fixed opening sheet 27 and the aperture blades 23 are in a state in which gaps are provided between them and they are not in contact with each other, and when the aperture blades 23 move in the direction of reducing the size of the third opening 23e, the aperture blades 23 approach the fixed opening sheet 27 as the amount of upward warpage increases.

When the aperture blades 23 move such that the size of the opening 23e (third opening) goes from its largest to its smallest, that is, from fully open to tightly constricted, the distal ends 23d of the aperture blades 23 pass through three regions as the amount of upward warpage increases in the optical axis X direction.

The first region is a region on the opposite side from the direction of upward warpage from the extension line Y2, the second region is a region between the extension line Y2 and the extension line Y1, and the third region is a region on the upward warpage direction side of the extension line Y1. The spacer 25f of the cover 25 is configured between the extension line Y2 and the extension line Y1, and forms the second region.

By providing the second region, even if the amount of upward warpage of the aperture blades 23 is large, some of the upward warpage to the inside of the aperture unit 20 in the optical axis X direction, that is, to the inside of the fixed opening sheet 27 in the optical axis X direction, can be absorbed and accommodated, so the aperture blades 23 are less likely to protrude outside of the aperture unit 20 in the optical axis X direction.

The second region is preferably thick in the optical axis X direction in order to minimize the amount of upward warpage, but if the second region is too thick, the aperture unit 20 ends up being too large. Therefore, the second region is preferably approximately equal to the size in the optical axis X direction of the blade chamber in which the aperture blades 23 are accommodated, or between approximately equal and approximately twice the size, or between approximately equal and approximately three times the size. Furthermore, when the aperture unit size is prioritized, the second region may be approximately half of the size in the optical axis X direction of the blade chamber in which the aperture blades 23 are accommodated, or between approximately half and approximately the same size, or between approximately half and approximately twice the size.

Thus, it is possible to prevent the position of the fixed opening diameter and the position of the aperture opening of the aperture blades 23 from being disposed at positions that are apart in the light incident direction.

Foreign Matter Intrusion Prevention Structure

The aperture unit 20 of this embodiment comprises a foreign matter intrusion prevention structure for preventing grease, foreign matter, and the like from entering the gap between the base plate 21 and the cover 25. This foreign matter intrusion prevention structure will be described below with reference to FIGS. 18 to 20.

Figure 18:
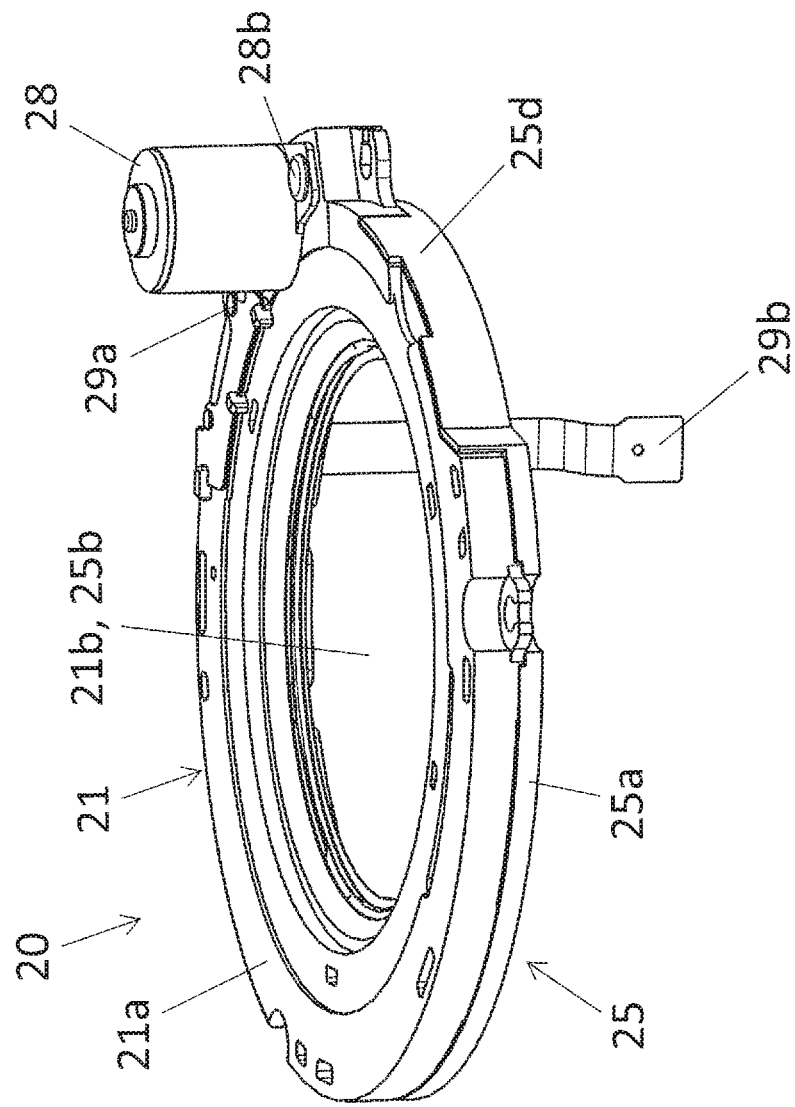
FIG. 18 is an oblique view of the configuration of a wall provided to the cover in order to prevent oil from entering in the aperture unit in FIG. 3.

The foreign matter intrusion prevention structure is constituted by a wall (second wall) 25d disposed on the outer peripheral side of the cover 25 shown in FIG. 18, and a wall (first wall) 21c disposed on the outer peripheral side of the base plate 21 shown in FIG. 19.

As shown in FIG. 19, the wall 21c is disposed so as to cover part of the outer peripheral portion of the annular main body 21a of the base plate 21.

As shown in FIGS. 10 and 18, the wall 25d is a wall-shaped member erected on a part of the main body 25a along the outer periphery thereof, and is disposed at a position that overlaps the wall 21c on the base plate 21 side.

With the aperture unit 20 in this embodiment, the foreign matter intrusion prevention structure is disposed on the outer peripheral side where grease infiltration is a concern, in order to prevent grease, foreign matter, or the like from coming into contact with the aperture blades 23 that move in the gap between the base plate 21 and the cover 25.

Here, the aperture unit 20 has a configuration in which the aperture blades 23 are sandwiched between the cover 25 and the base plate 21 in order to accommodate the aperture blades 23 and hold them in the optical axis X direction.

With this configuration, since a gap is formed between the base plate 21 and the cover 25, when a part to which grease or a foreign substance has adhered is disposed near the aperture unit 20, there is the risk that this grease or the like will stick to the aperture unit 20 and find its way into the interior of the aperture unit 20 through the gap. For instance, if grease that has come in through the gap sticks to the aperture blades 23, the drive load of the aperture blades 23 may increase so much that the blades will not rotate smoothly.

With the aperture unit 20 in this embodiment, the wall 21c and the wall 25d are provided to the portions where grease or the like is likely to adhere. More specifically, the wall 25d is provided to the cover 25, and the wall 21c is provided to the base plate 21.

The wall 21c and the wall 25d have a staggered overlapping structure in which they are provided on the upstream side and the downstream side in the light incident direction, respectively. This eliminates a gap that can be seen from the outer peripheral side of the aperture unit 20, and has the walls 21c and 25d disposed in a staggered layout, so it effectively prevents foreign substances such as grease from sticking to the aperture blades 23.

Also, the effect of preventing foreign matter such as grease from entering can be further improved by applying an oil-repellent component such as an oil barrier to a portion of the staggered structure constituted by the wall 25d and the wall 21c.

Embodiment 2

The aperture unit (light shielding unit) 120 according to Embodiment 2 of the present disclosure will now be described with reference to FIGS. 21A to 25.

The aperture unit 120 in this embodiment differs from the configuration of Embodiment 1 above in that it comprises aperture blades (movable blades, second blades) 123 having a different shape in addition to the aperture blades 23 described in Embodiment 1 above.

Components having the same functions and shapes as those Embodiment 1 above will be numbered the same and will not be described again.

Figure 21A:
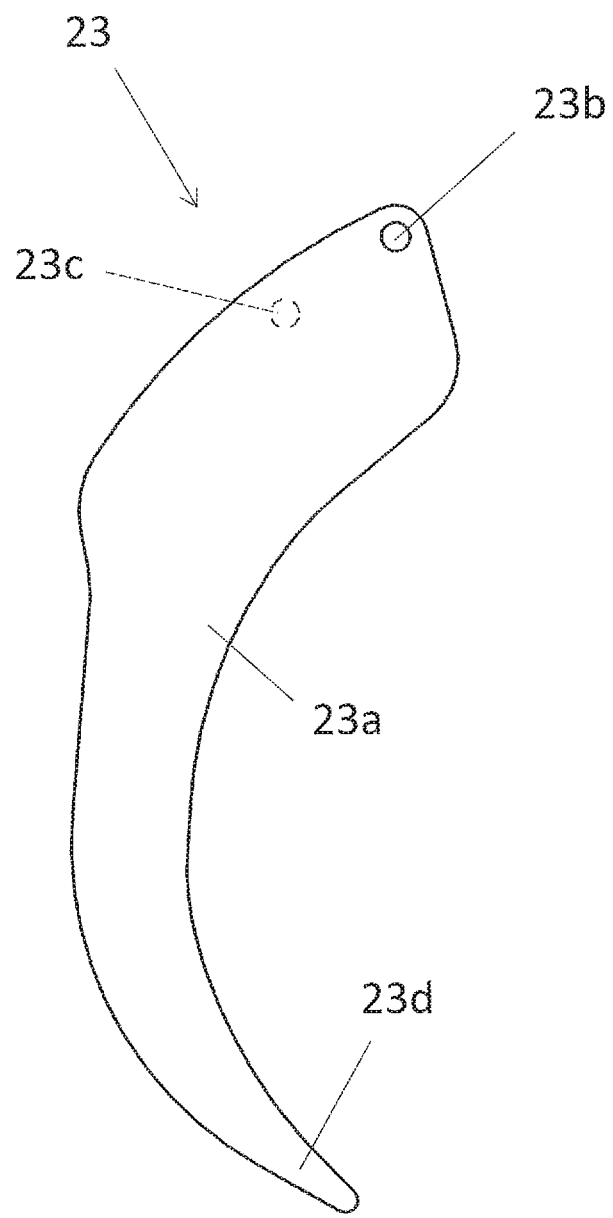
FIG. 21A shows the configuration of an aperture blade (first blade) constituting the aperture unit in another embodiment of this disclosure.
Figure 21B:
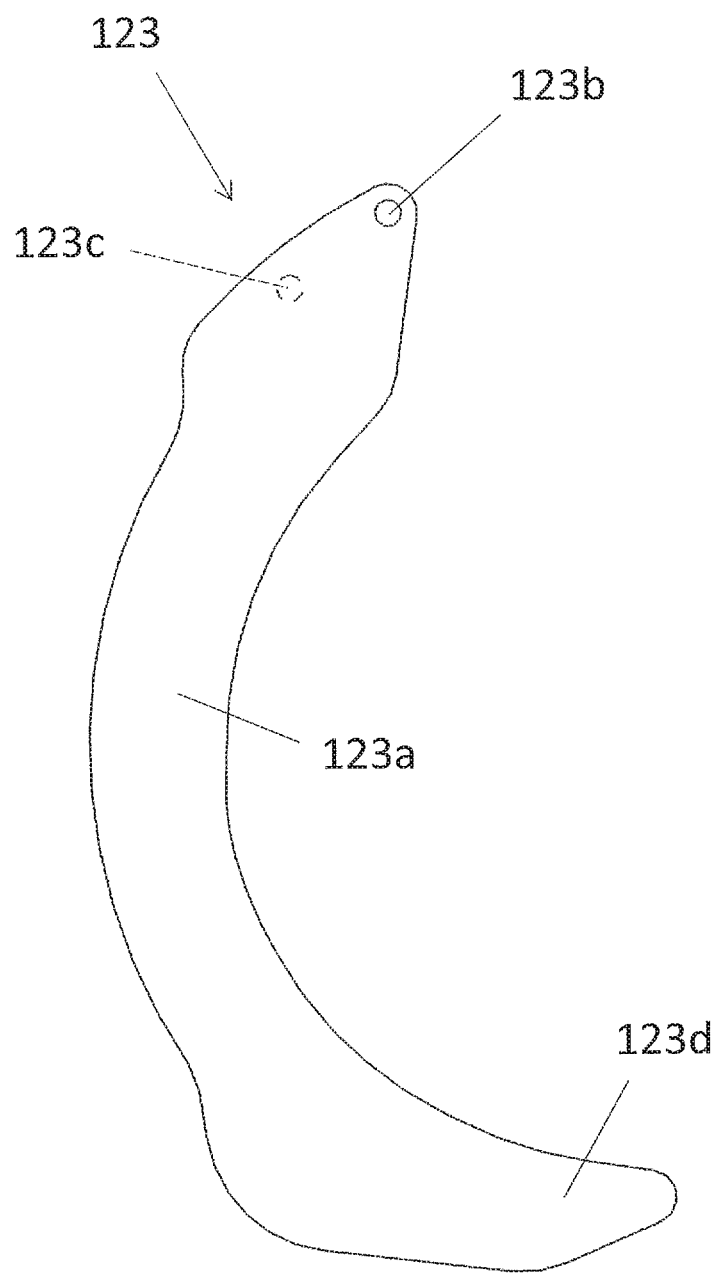
FIG. 21B shows the configuration of an aperture blade (second blade) constituting the aperture unit in another embodiment of this disclosure.

That is, with the aperture unit 120 in this embodiment, the six aperture blades (movable blades, first blades) 23 shown in FIG. 21A and the five aperture blades 123 shown in FIG. 21B combine to form an aperture opening (third opening) 123e.

As shown in FIG. 21A, the aperture blades 23 each have a main body 23a, a boss 23b (first main shaft), a boss 23c (first auxiliary shaft), and a distal end 23d. Since these components are the same as those in Embodiment 1 above, they will not be described again here.

As shown in FIG. 21B, the aperture blades 123 have a greater overall length than the aperture blades 23, and each has a main body 123a, a boss 123b (second main shaft), a boss 123c (second auxiliary shaft), and a rotating portion 123d.

As shown in FIG. 21B, the main body 123a is a plate-shaped member, and is molded from a high-rigidity resin such as LCP (liquid crystal polymer), PPS (polyphenylene sulfide), or PA (polyamide).

Since the aperture blades 123 are thus formed using a material having relatively high rigidity, the amount of upward warpage of the alternately disposed aperture blades 23 can be suppressed.

The boss 123b (second main shaft) is provided protruding from the upper surface (the surface facing the drive ring 22) at one end (first end) of the main body 123a, serving as the rotation shaft when the aperture blade 123 rotates. The boss 123b (second main shaft) is inserted into a through-hole formed at the center portion of the protrusion 22c on the drive ring 22 described above. Accordingly, the bosses 123b (second main shafts) move in the circumferential direction along with the rotational drive of the drive ring 22 during the opening or closing of the aperture blades 123 (discussed below).

The bosses 123c (second auxiliary shafts) are provided so as to protrude from the surface (the surface facing the cover 25) of the main body 123a on the opposite side form the bosses 123b (second main shafts). The bosses 123c (second auxiliary shafts) are inserted into the cam grooves 25c (see FIG. 10) formed in the cover 25 (discussed below). Accordingly, when the drive ring 22 is rotationally driven and the aperture blades 123 move in the circumferential direction during the opening or closing of the aperture blades 123 (discussed below), the bosses 123c (second auxiliary shafts) move while being guided by the cam grooves 25c. Consequently, the amount of light passing through the open portion of the aperture unit 120 can be adjusted by varying the amount of rotation of the aperture blades 123 according to the amount of rotation of the drive ring 22, and thereby varying the surface area or diameter of the opening 123e formed by the aperture blades 123. When the drive ring 22 is rotationally driven, the relative positions of the bosses 123b (second main shafts) and the bosses 123c (second auxiliary shafts) with respect to the base plate 21 or the cover 25 change, and the aperture blades 123 move rotate around the bosses 123b (second main shafts), changing the size of the opening of the aperture unit 20.

The rotating portion 123d is provided on the other end (second end) side of the main body 123a, and when the aperture blade 123 rotates around the boss 123b (second main shaft), the rotating portion 123d moves in the gap between the base plate 21 and the cover 25.

With the aperture unit 120 in this embodiment, the aperture blades 23 and 123 having different shapes are alternately disposed in the circumferential direction.

Figure 22A:
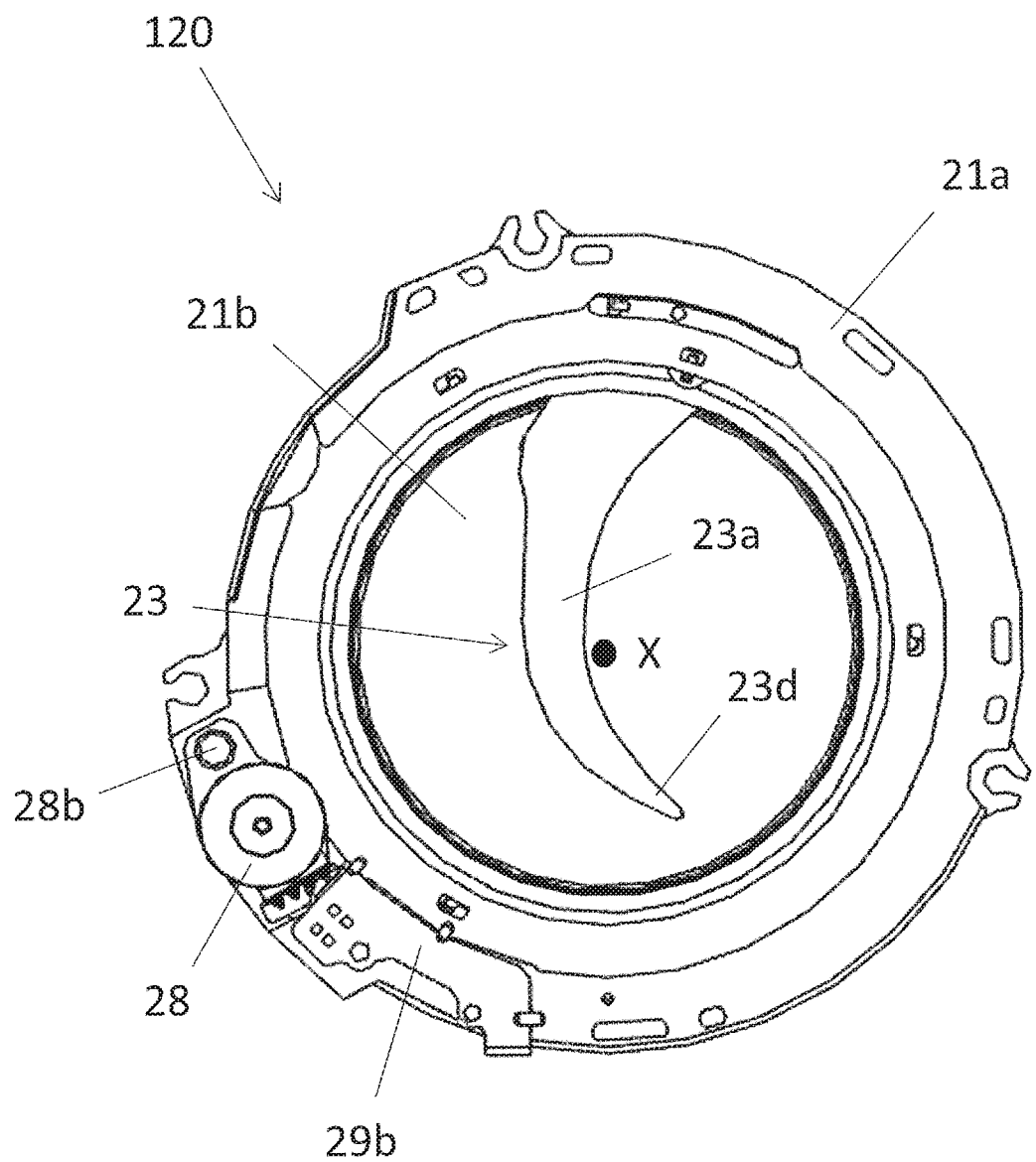
FIG. 22A is a diagram of the configuration of an aperture unit in which the one aperture blade (first blade) shown in FIG. 21A is disposed, as viewed from the subject side.
Figure 22B:
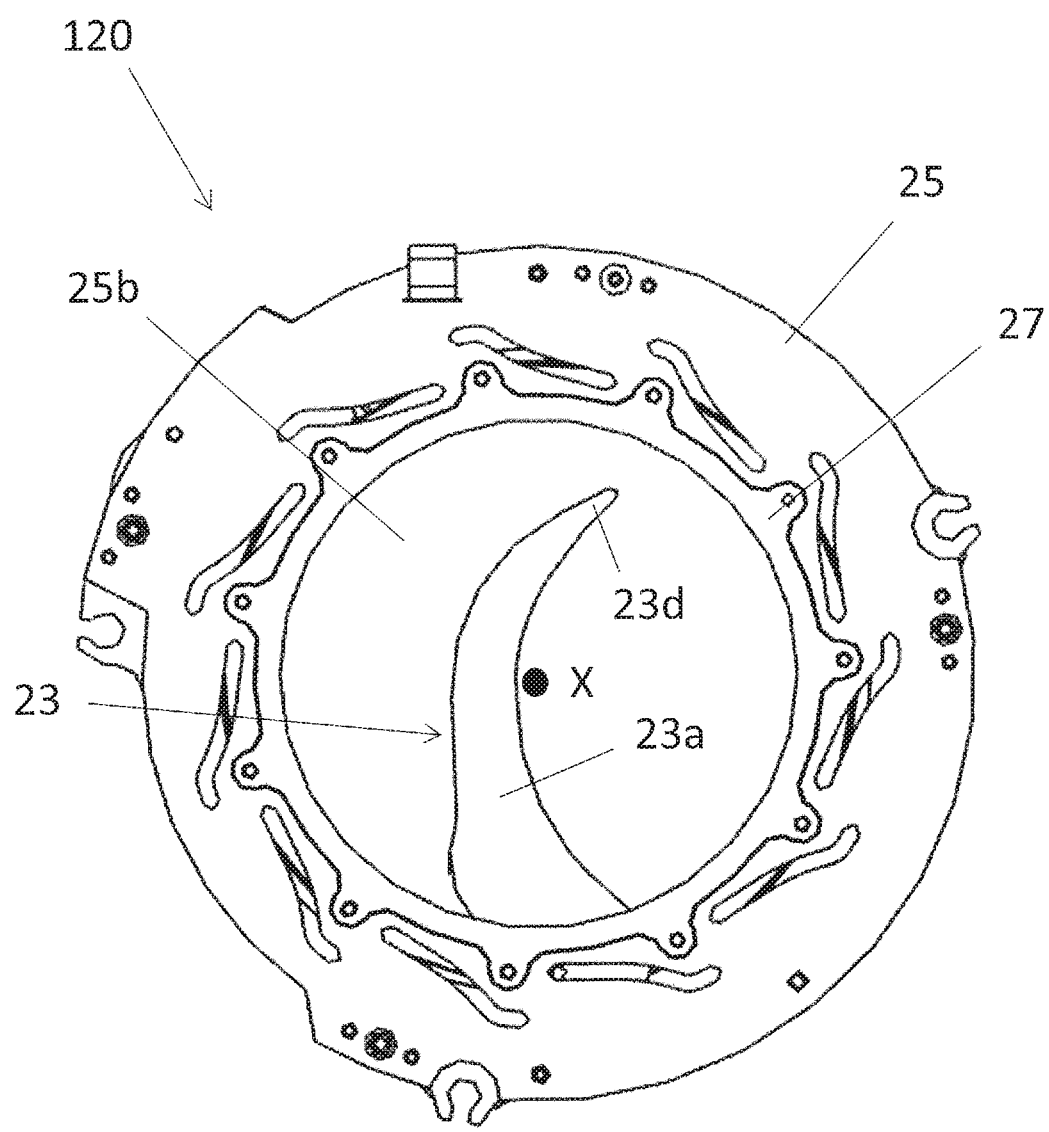
FIG. 22B is a diagram of the configuration of an aperture unit in which the one aperture blade (first blade) shown in FIG. 21A is disposed, as viewed from the opposite side from the subject side.

Here, when the aperture blades 23 rotate to a state in which the opening diameter of the opening 123e is at its smallest (closed state), the distal ends 23d move from between the base plate 21 and the cover 25 to near the optical axis X, as shown in FIGS. 22A and 22B.

Figure 24A:
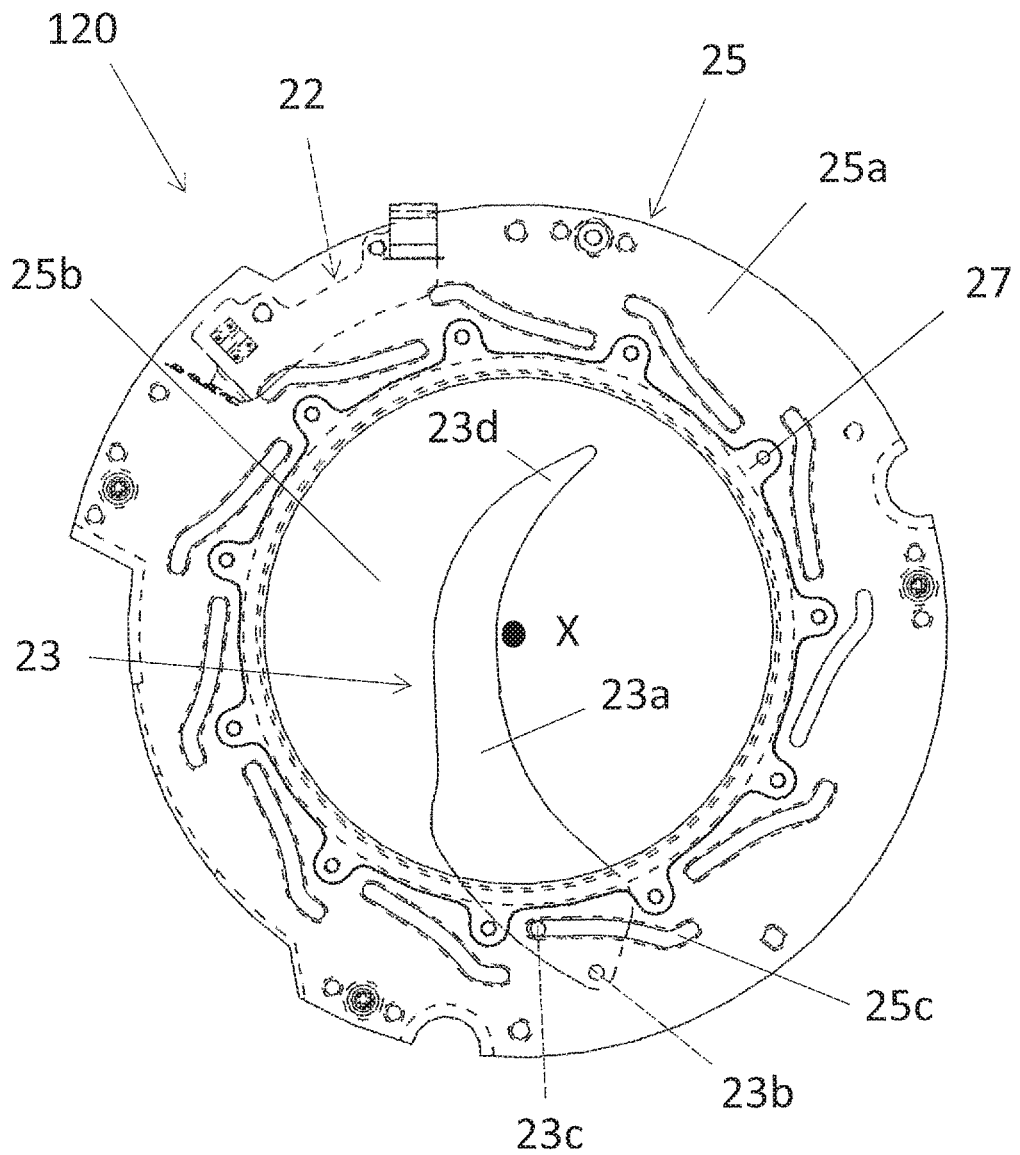
FIG. 24A is a see-through view of the configuration of the aperture unit in which the one aperture blade (first blade) shown in FIG. 21A is disposed, as viewed from the opposite side from the subject side.
Figure 24B:
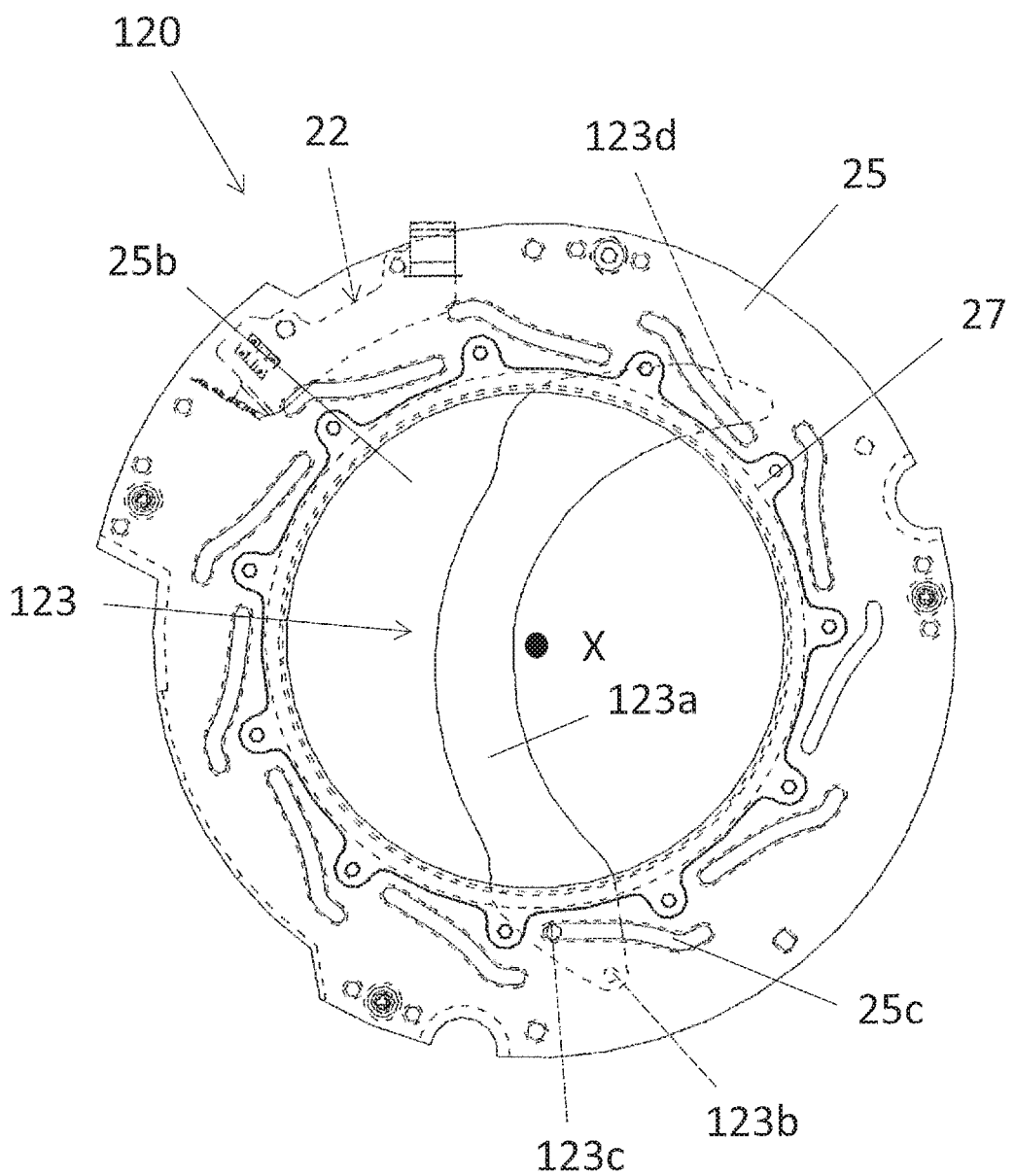
FIG. 24B is a see-through view of the configuration of the aperture unit in which the one aperture blade (second blade) illustrated in FIG. 21B is disposed, as viewed from the opposite side from the subject side.

At this point, as shown in FIG. 24A, the aperture blades 23 are driven open or closed when the bosses 23c (first auxiliary shafts) move in the cam grooves 25c provided to the cover 25, with the bosses 23b (first main shafts) inserted into the through-hole formed in the center of the protrusions 22c provided to the drive ring 22 serving rotation shafts.

Figure 23A:
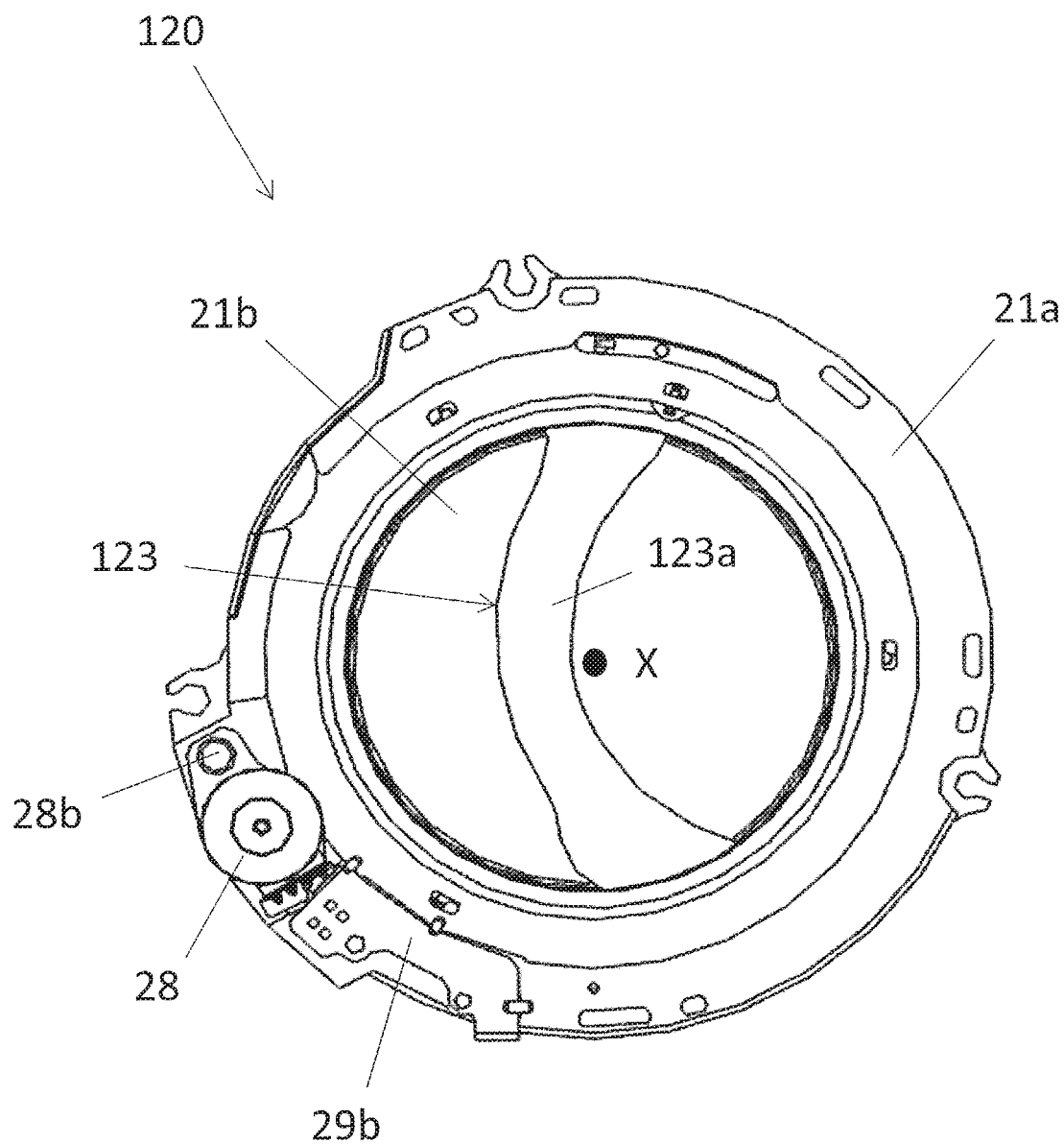
FIG. 23A is a diagram of the configuration of an aperture unit in which the one aperture blade (second blade) shown in FIG. 21B is disposed, as viewed from the subject side.
Figure 23B:
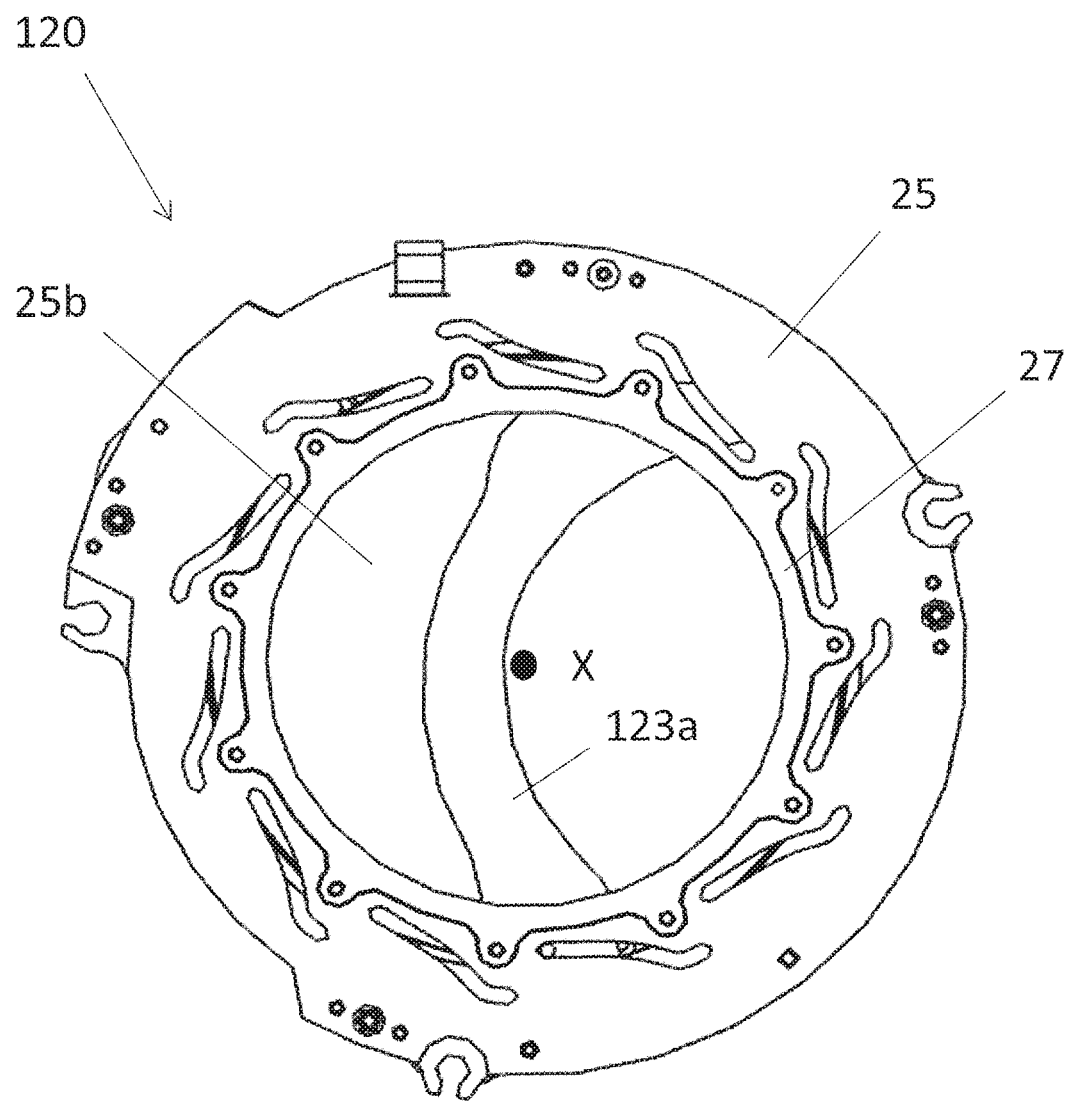
FIG. 23B is a diagram of the configuration of an aperture unit in which the one aperture blade (second blade) shown in FIG. 21B is disposed, as viewed from the opposite side from the subject side.

Meanwhile, when the aperture blades 123 rotate to a state in which the opening diameter of the opening 123e is at its smallest (closed state), the rotating portions 123d rotate within the gap between the base plate 21 and the cover 25, without coming out from the gap between the base plate 21 and the cover 25, as shown in FIGS. 23A and 23B. Accordingly, in any state in which the aperture blades 123 have rotated to reduce the opening diameter of the opening 123e, the two ends thereof do not come out of the gap between the base plate 21 and the cover 25. That is, the aperture blades 123 are in a state in which their two ends are always held between the base plate 21 and the cover 25, so the position in the light incident direction is stabilized.

Therefore, unlike the aperture blades 23, even in a state in which the aperture blades 123 have constricted to reduce the opening diameter of the opening 123e, there is no upward warpage to the downstream side in the light incident direction in the aperture blades 123 by themselves.

At this point, just as with the aperture blades 23, the aperture blades 123 are driven open and closed when the bosses 123c (second auxiliary shafts) move along the cam grooves 25c provided to the cover 25, with the bosses 123b (second main shafts) inserted into the through-holes formed in the center of the protrusions 22c provided to the drive ring 22 serving as rotation shafts.

As described above, the aperture unit 120 in this embodiment is configured such that the aperture blades 23 shown in FIG. 21A and the aperture blades 123 shown in FIG. 21B are combined so as to be disposed alternately in the circumferential direction.

Figure 25:
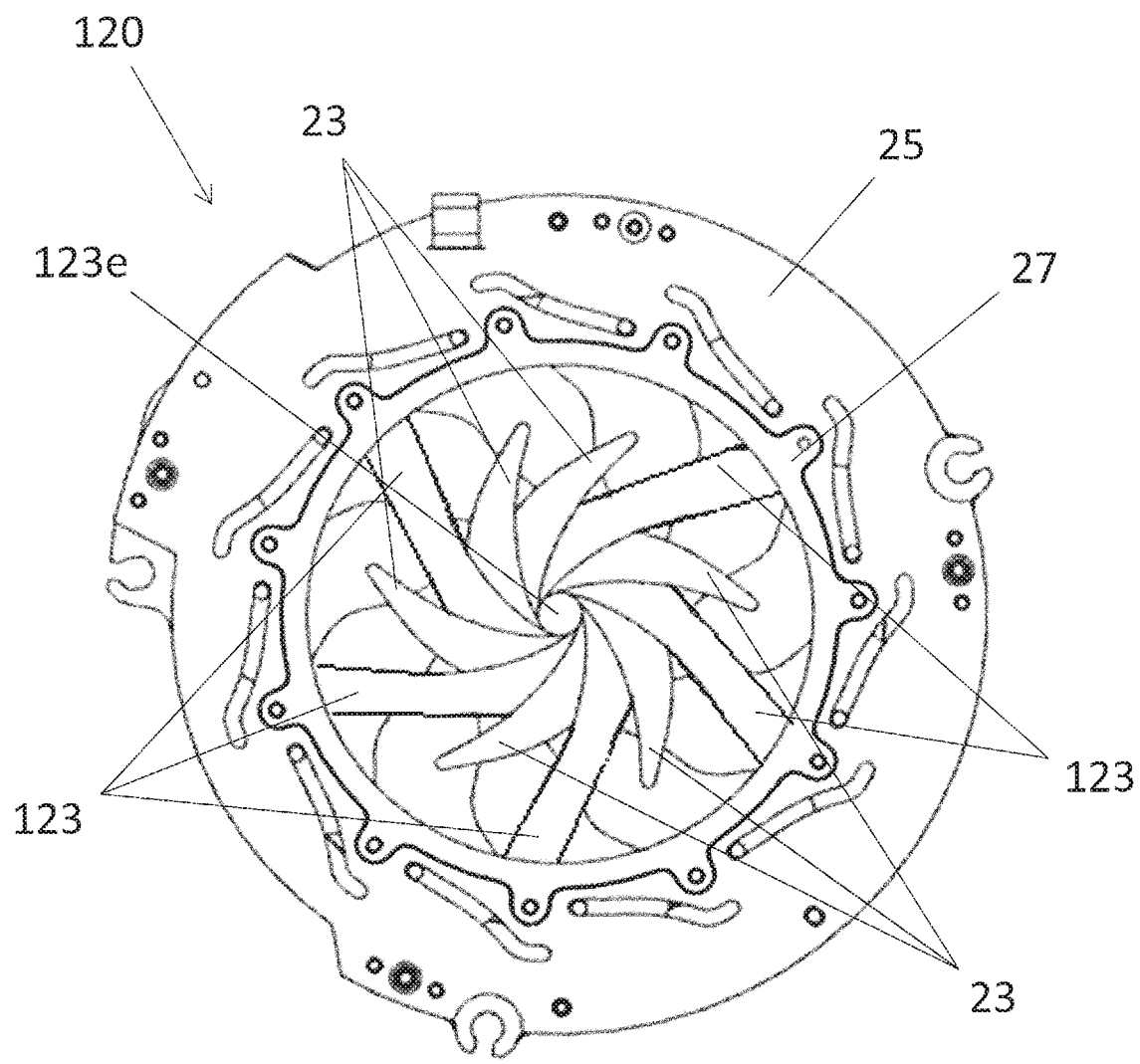
FIG. 25 is a diagram of a state in which the aperture blades (first blades) shown in FIG. 21A and the aperture blades (second blades) shown in FIG. 21B are alternately disposed in the circumferential direction and constricted (a state in which the opening diameter is reduced), as viewed from the opposite side from the subject side.

Consequently, as shown in FIG. 25, even when the six aperture blades 23 and the five aperture blades 123 have been rotated so that the opening diameter of the opening 123e of the aperture unit 120 is at its smallest, the amount of upward warpage toward the downstream side in the light incident direction can be suppressed.

Furthermore, using a combination of the aperture blades 23 and the aperture blades 123 as in this embodiment allows the drives load exerted on the drive motor 28, which is necessary for moving the rotating portion 123d in the gap between the base plate 21 and the cover 25, can be reduced as compared to a configuration in which the opening 123e is formed using just the aperture blades 123, for example.

With the configuration of the aperture unit 120 in this embodiment, as described above, the aperture blades 23 and the aperture blades 123 are used in combination, so that the amount of upward warpage of the aperture blades 23 to the downstream side in the light incident direction can be suppressed, and the load on the drive motor 28 can be reduced.

With the aperture unit 120 in this embodiment, as in Embodiment 1 above, the two protrusions 22c and 25e provided to the base plate 21 and the cover 25, respectively, hit a part of the aperture blades 23 and 123, allowing the amount of upward warpage of the aperture blades 23 and 123 to be suppressed.

However, as in this embodiment, when using a combination of the aperture blades 23 and 123 having different shapes, the aperture blades 123 have the function of suppressing the upward warpage of the aperture blades 23, and therefore the aperture unit 120 in this embodiment may have a configuration that does not include the two protrusions 22c and 25e described in Embodiment 1 above.

Other Embodiments

Embodiments of the present disclosure were described above, but the present disclosure is not limited to or by the above embodiments, and various modifications are possible without departing from the gist of the disclosure.

(A)

In Embodiments 1 and 2 above, an example was described in which a plurality of the flat aperture blades 23 and 123 were combined to adjust the surface area or the diameter of the openings 23e and 123e. However, the present disclosure is not limited to this.

Figure 26:
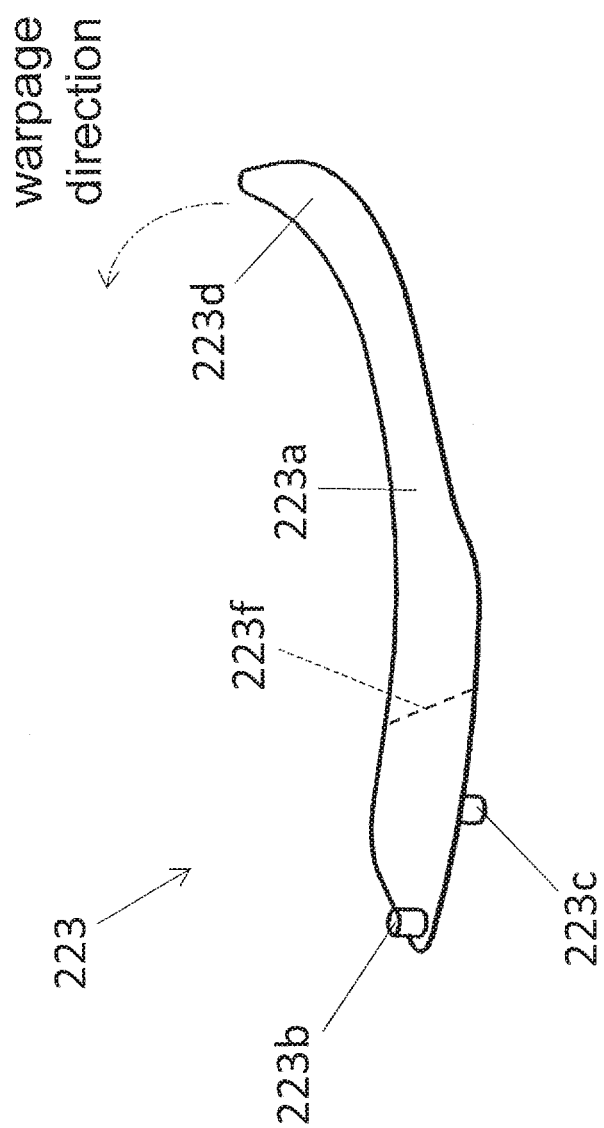
FIG. 26 is an oblique view of the configuration of an aperture blade included in the aperture unit in yet another embodiment of the present disclosure.

For instance, as shown in FIG. 26, an aperture unit (light shielding unit) 220 may be configured using aperture blades 223 having a shape that bends toward (upward in the drawing) the surface on which the boss 223b is provided (the surface facing the drive ring 22), starting from a bent portion 223f formed at a position near the base (boss 223b) of the main body 223a.

Figure 27:
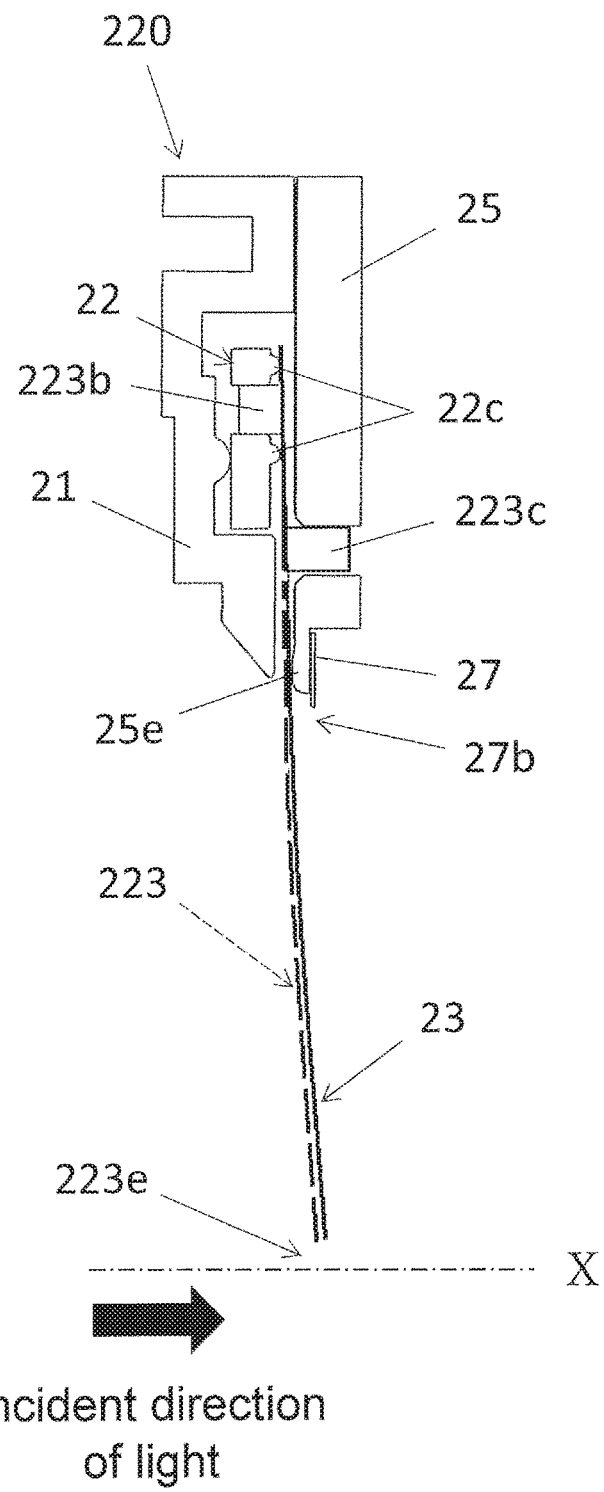
FIG. 27 is a cross section comparing the effect of suppressing the upward warpage of the aperture blades, between the configuration in FIG. 26 in which the aperture blades are constricted (a state in which the opening diameter is reduced) and the configuration in Embodiment 1.

That is, with this configuration, as shown in FIG. 26, the aperture blade 223 has a shape that is bent ahead of time in the opposite direction from that of upward warpage due to blade weaving. Therefore, even in a state in which the aperture blades 223 are closed, that is, when the blades have transitioned to a state in which the opening diameter or the surface area of the opening 223e is reduced, the amount of upward warpage can be more effectively suppressed than when using the aperture blades 23 in Embodiment 1 above (solid line), as indicated by the broken line in FIG. 27.

The direction in which the individual aperture blades are bent is not limited to the direction shown in FIG. 26, and with a configuration in which the side where the distal ends of the aperture blades are woven together is disposed on the opposite side (the subject side), the blades may be bent in the opposite direction from that in FIG. 26, that is, to the subject side.

With the aperture unit 220 in this embodiment, just as in Embodiment 1 above, the two protrusions 22c (first support) and 25e (second support) provided to the base plate 21 and the cover 25, respectively, will hit a part of the aperture blades 223, thereby suppressing the amount of upward warpage of the aperture blades 223.

However, using the aperture blades 223 having a pre-bent shape as in this embodiment gives the aperture blades 223 themselves an upward warpage suppressing effect, so the aperture unit 220 in this embodiment may be configured not to include the two protrusions 22c and 25e described in Embodiment 1 above.

(B)

In Embodiments 1 and 2 above, an example of an aperture unit (light shielding unit) was described in which, in a state in which the aperture blades 23 and 123 are constricted (a state in which the opening diameter or the surface area is reduced), the aperture blades 23 and 123 warp upward toward the downstream side (image plane side) in the light incident direction. However, the present disclosure is not limited to this.

For instance, the aperture unit may be configured such that in their constricted state the aperture blades warp upward toward the upstream (subject side) in the light incident direction. The side where the distal ends of the aperture blades are woven together may be the subject side.

(C)

In Embodiments 1 and 2 above, an example was given of a configuration in which the protrusions 22c (first support) and 25e (second support) are provided to hit part of the aperture blades 23 and 123 and to suppress the upward warpage of the aperture blades 23 and 123 when the open portions of the aperture units 20 and 120 are closed. However, the present disclosure is not limited to this.

For instance, the support for suppressing the upward warpage of the aperture blades in the closed state of the open portions of the aperture units may be a flat member instead of a protruding shape. That is, the shape of the support does not need to be one that protrudes, and the support may be any member that supports the support in the direction of suppresses upward warpage.

(D)

In Embodiments 1 and 2 above, an example was given of a configuration in which the drive ring 22 and the cover 25 are respectively provided with the protrusions 22c (first support) and 25e (second support) as supports for suppressing upward warpage of the aperture blades 23 and 123 in the closed state of the opening portions of the aperture units 20 and 120. However, the present disclosure is not limited to this.

For instance, the configuration may be such that just one of the protrusions 22c (first support) and 25e (second support) is provided as a support for suppressing upward warpage of the aperture blades when the opening portion of the aperture units are closed.

(E)

In Embodiments 1 and 2 above, an example was given in which the plurality of annular protrusions 22c provided along the circumferential direction on the substantially annular drive ring 22 are used as supports (first supports). However, the present disclosure is not limited to this. For instance, the shape of the support (first support) is not limited to an annular protrusion, and may be some other shape such as a columnar shape or a polygonal shape.

(F)

In Embodiments 1 and 2 above, an example was given in which the plurality of annular protrusions 22c provided along the circumferential direction on the substantially annular drive ring 22 are used as supports (first supports). However, the present disclosure is not limited to this.

For instance, rather than going through, the holes in the drive ring 22 (drive ring) may have a bottom portion (first support) constituting the surface facing the aperture blades 23 side, that is, the surface that is across from the distal ends of the rotation shafts (first main shafts), and the bottom portion (first support) supports by hitting the distal ends of the rotation shafts (first main shafts).

In this case, the bottom (first support) is configured in a concave shape from the surface of the drive ring 22 (drive ring). The shape of the distal ends of the rotation shafts (first main shafts), or of the bottom portions (first supports), may be a flat shape, a spherical surface, a conical surface, some other rotationally symmetric surface, a polygonal pyramid shape, or the like.

(G)

In Embodiments 1 and 2 above, an example was given in which a single annular protrusion 25e provided on the inner diameter side of the substantially annular cover 25 is used as a support (second support). However, the present disclosure is not limited to this.

For instance, a plurality of arc-shaped or linear protrusions formed along the rotation path of the aperture blades may be used as the support (second support).

(H)

In Embodiments 1 and 2 above, as an example of a blade drive mechanism, an example was described in which the bosses 23b (first main shafts) and 123b (second main shafts) functioning as rotation shafts are provided on the aperture blades 23 and 123 side, and through-holes into which the bosses 23b (first main shafts) and 123b (second main shafts) are inserted are provided on the drive ring side. However, the present disclosure is not limited to this.

For instance, the configuration may be such that the rotation shafts are provided on the drive ring side, and holes 23 (first main holes) and holes 123 (second main holes) into which the rotary shafts are inserted are provided on the aperture blades 23 and 123 side.

In this case, protrusions (first supports) are disposed at substantially equal angular intervals in the circumferential direction so as to protrude in an annular shape from the surface of the main body that is in contact with the opposite surface from the direction of upward warpage of the aperture blades, the opposite side from the subject side (the cover 25 side), that is, from the surface on the image plane side. The protrusions hit a part of the aperture blades at the annular portion, and support the aperture blades from the subject side.

Also, rotation shafts are formed in the approximate center of the annularly protruding portions of the protrusions (first support), and are inserted into holes (first main holes) in the aperture blade. The protrusions (first support) are configured in a convex shape from the surface of the drive ring, and support the vicinity of the rotation shafts.

Therefore, the blade driving mechanism is not limited to the bosses 23b (first main shafts) and 123b (second main shafts) on the side of the aperture blades 23 and 123, and the through-holes into which the bosses 23b (first main shafts) and 123b (second main shafts) on the side of the drive ring 22 are inserted. Any drive mechanism may be used as long as the movable blades and the drive ring are engaged, and drive force is transmitted to the movable blades as the drive ring is rotationally driven.

(I)

In Embodiments 1 and 2 above, as an example of the cam mechanism, an example was described in which the bosses 23c (first auxiliary shafts) and 123c (second auxiliary shafts) that move along the cam grooves 25c are provided on the aperture blades 23 side, and the cam grooves 25c into which the bosses 23c (first auxiliary shafts) and 123c (second auxiliary shafts) are inserted are provided on the cover 25 side. However, the present disclosure is not limited to this.

For instance, the configuration may be such that cam grooves 23 (first auxiliary holes) and cam grooves 123 (second auxiliary holes) are provided on the aperture blades 23 and 123 side, and bosses that move along the cam grooves are provided on the cover side.

In the opening or closing operation of the aperture blades, when the drive ring is rotationally driven and the aperture blades move in the circumferential direction, this is accompanied by movement of the cam grooves (first auxiliary holes and second auxiliary holes) on the aperture blade side while being guided by the bosses on the cover side.

Consequently, the amount of light passing through the opening portion of the aperture unit 20 can be adjusted by varying the amount of rotation of the aperture blades according to the amount of rotation of the drive ring, and thereby varying the surface area or the diameter of the opening 23e formed by the aperture blades.

When the drive ring is rotationally driven, the relative positions of the bosses 23b (first main shafts) and 123b (second main shafts) and the cam grooves 23 (first auxiliary holes) and the cam grooves 123 (second auxiliary holes) with respect to the base plate 21 or the cover 25 are changed, the aperture blades rotate around the bosses 23b (first main shafts), and the size of the opening of the aperture unit 20 changes.

(J)

In Embodiments 1 and 2 above, as an example of the cam mechanism, an example was described in which through-holes into which the bosses 23b (first main shafts) and 123b (second main shafts) of the aperture blades 23 and 123 are inserted are provided on the drive ring 22 side, and the cam grooves 25c into which the bosses 23c (first auxiliary shafts) the bosses 123c (second auxiliary shafts) are inserted are provided on the cover 25 side. However, the present disclosure is not limited to this.

For instance, the configuration may be such that the cam grooves are provided on the drive ring side and the through-holes are provided on the cover side.

In the opening or closing operation of the aperture blades, when the drive ring is rotationally driven and the aperture blades move in the circumferential direction, the aperture blades rotate around the main bosses (first main shafts and second main shafts) inserted into the through-holes of the drive ring, and the auxiliary bosses (first auxiliary shafts and second auxiliary shafts) of the aperture blades move while being guided by the cam grooves on the drive ring side. Consequently, the amount of light passing through the opening portion of the aperture unit 20 can be adjusted by varying the amount of rotation of the aperture blades according to the amount of rotation of the drive ring, and thereby varying the surface area or the diameter of the opening 23e formed by the aperture blades.

When the drive ring is rotationally driven, the relative positions of the main bosses (first main shafts and second main shafts) and the auxiliary bosses (first auxiliary shafts and second auxiliary shafts) with respect to the base plate 21 or the cover 25 change, the aperture blades rotate around the main bosses 23b (first main shafts and second main shafts), and the size of the opening of the aperture unit 20 changes.

In this case, a plurality of protrusions, which are supports (first supports), are formed along the circumferential direction on the cover and protrude in an annular shape, and through-holes are disposed in the approximate centers of these annular protrusions. The protrusions, which are supports (first supports), protrude from the cover so as to be in contact with the surface on the opposite side from the direction of upward warpage of the aperture blades.

The protrusions, which are supports (second supports), are formed on the base plate (first frame) or the drive ring, and are located near the opening of the aperture unit, the opening of the base plate (first frame), or the opening of the drive ring. The protrusions, which are supports (second supports), are configured as parts disposed near the opening of the aperture unit. Furthermore, the supports (second supports) are located closer to the center axis side of the opening of the aperture unit than the supports (first supports), and are provided so as to be in contact with the surface on the same side as the direction of upward warpage of the aperture blades. Furthermore, the supports (second supports) are provided in an annular shape with respect to the center axis of the opening of the aperture unit. Furthermore, the supports (second supports) have a substantially arced shape, a substantially elliptical shape, a substantially parabolic shape, a substantially multidimensional curve shape, or a gentle curved shape in a cross sectional view that includes the center axis of the opening of the aperture unit.

(K)

The cam mechanism was described in Embodiments 1 and 2 and in (I) and (J) above. However, the cam mechanism is not limited to the above.

For instance, any cam mechanism may be used in which either a fixed frame (the base plate 21 or the cover 25) or a drive ring engages with the movable blades, and the movable blades move along with the rotation of the drive ring.

(L)

In Embodiment 1 above, an example was described in which the aperture unit 20 includes eleven movable aperture blades 23. However, the present disclosure is not limited to this.

For instance, the number of movable blades included in the aperture unit is not limited to eleven, and may instead be ten or fewer, or twelve or more.

(M)

In Embodiment 2 above, an example was described in which the aperture unit 120 includes six of the aperture blades 23 and five of the aperture blades 123. However, the present disclosure is not limited to this.

For instance, the aperture blades of different shapes included in the aperture unit are not limited to the above number, but may instead be a combination of five and six blades, or may be the same number of each, such as five and five, or six and six.

Also, the aperture blades of different shapes are not limited to two types, and may instead be made up of a combination of three or more types.

(N)

In the above embodiments, an example was described in which the content of the present disclosure is applied to the aperture unit 20 (light shielding unit) mounted on an interchangeable lens type of lens barrel 10. However, the present disclosure is not limited to this.

For instance, the light shielding unit is not limited to an interchangeable lens barrel, and can also be applied to a lens barrel that integrated with a camera body.

(O)

In the above embodiments, an example was described in which the content of the present disclosure is applied to the aperture unit (light shielding unit) 20 mounted on the lens barrel 10 disposed on the downstream side in the light incident direction of the fourth lens L4 functioning as a focus lens. However, the present disclosure is not limited to this.

The aperture unit 20 may be disposed on the upstream side in the light incident direction of the fourth lens L4 functioning as a focus lens.

In this case, the focus lens is disposed in the direction of the upward warpage of the aperture blades, and there is the risk of interference between the aperture blades and the focus lens during focusing, but if the content of the present disclosure is applied, the amount of upward warpage of the aperture blades is suppressed, so there is less risk of interference.

INDUSTRIAL APPLICABILITY

The light shielding unit disclosed herein has the effect of suppressing upward warpage of the movable blades while operating the movable blades smoothly, and can therefore be widely applied to a variety of devices such as optical devices.

The invention claimed is:

1. A light shielding unit, comprising:
a first frame having a first opening through which light passes;
a second frame having a second opening through which the light passes;
a plurality of movable blades that are disposed between the first frame and the second frame, in which is formed a third opening through which the light that has passed through the first opening passes, and that adjust the amount of light passing through by varying the size of the third opening;

a drive ring that is disposed between the first frame and the second frame and is rotatably driven when the movable blades are opened and closed; and a support that is provided to the first frame and/or the second frame and supports the movable blades in the direction of suppressing upward warpage of the movable blades in a state in which the movable blades have moved in the direction of reducing the size of the third opening, wherein the support includes a first support that is provided to the first frame, the second frame, or the drive ring, which is in contact with the surface on the opposite side from the direction of upward warpage of the movable blades, the support includes a second support that is located closer to the center axis side of the first opening, the second opening, or the third opening than the first support, and is provided so as to be in contact with the surface on the same side as the direction of the upward warpage of the movable blades, and the second support is a protrusion that is provided in an annular shape with respect to the center axis of the first opening, the second opening, or the third opening, and protrudes to the opposite side from the direction of the upward warpage of the movable blades.

2. The light shielding unit according to claim 1,
wherein a plurality of the first supports are provided in the circumferential direction.

3. The light shielding unit according to claim 1,
wherein the second support has a curved shape in a cross section that includes the center axis of the first opening, the second opening, or the third opening.

4. The light shielding unit according to claim 1,
wherein the second support is disposed near the first opening, the second opening, or the third opening.

5. The light shielding unit according to claim 1,
wherein the movable blades include first blades having a first main shaft or a first main hole provided on a first end side, and a free end provided on a second end side that is on the opposite side from the first main shaft or the first main hole, and when the movable member moves in the direction of reducing the size of the third opening, the free end side rotates around the first main shaft or the first main hole and toward the center axis of the third opening.

6. The light shielding unit according to claim 5,
wherein the first support is constituted by the first frame, the second frame, or the drive ring, and supports the vicinity of the first main shaft or the first main hole.

7. The light shielding unit according to claim 1,
wherein the first support is configured in a convex shape from the surface of the first frame, the second frame, or the drive ring.

8. The light shielding unit according to claim 5,
wherein the first support is constituted by the first frame, the second frame, or the drive ring, and supports the distal end of the first main shaft.

9. The light shielding unit according to claim 5,
wherein the first support is configured in a concave shape from the surface of the first frame, the second frame, or the drive ring.

10. The light shielding unit according to claim 5,
wherein the first blades further have a first auxiliary shaft or a first auxiliary hole, and the size of the third opening is changed by changing the relative positions of the first main shaft or the first main hole and the first auxiliary shaft or the first auxiliary hole.

11. The light shielding unit according to claim 10,
wherein the first main shaft or the first main hole is engaged with the first frame, and
the first auxiliary shaft or the first auxiliary hole is engaged with the drive ring.

12. The light shielding unit according to claim 10,
wherein the first main shaft or the first main hole is engaged with the second frame, and
the first auxiliary shaft or the first auxiliary hole is engaged with the drive ring.

13. The light shielding unit according to claim 10,
wherein the first main shaft or the first main hole is engaged with the drive ring, and
the first auxiliary shaft or the first auxiliary hole is engaged with the first frame.

14. The light shielding unit according to claim 10,
wherein the first main shaft or the first main hole is engaged with the drive ring, and
the first auxiliary shaft or the first auxiliary hole is engaged with the second frame.

15. The light shielding unit according to claim 10,
wherein, at least when moving in the direction of reducing the size of the third opening,
the first auxiliary shaft or the first auxiliary hole moves toward the center axis side of the first opening, the second opening, or the third opening with respect to the first main shaft or the first main hole.

16. The light shielding unit according to claim 5,
wherein, when the movable blades move in the direction of reducing the size of the third opening, the free end sides of movable blades that are adjacent to each other are woven together.

17. The light shielding unit according to claim 1,
further comprising a drive motor that imparts a drive force to move the movable blades.

18. The light shielding unit according to claim 17,
wherein the drive ring is rotationally driven around the center axis of the first opening, the second opening, and/or the third opening by the drive motor.

19. The light shielding unit according to claim 1,
wherein the movable blades have a shape that is warped to the opposite side from the upward warpage direction.

20. The light shielding unit according to claim 1,
wherein the second frame further has a fixed opening member that constitutes the second opening that is substantially the same size as or smaller than the third opening when the movable blades are in a fully opened state, and
when the movable blades move in the direction of reducing the size of the third opening, the movable blades move in the same direction as the direction of the upward warpage, so as to go beyond the plane constituting the third opening formed by the fixed opening member as the amount of upward warpage increases.

21. The light shielding unit according to claim 20,
wherein part of the main body of the second frame is disposed between the fixed opening member and the movable blades, and
when the movable blades move in the direction of reducing the size of the third opening while the third opening is in its fully opened state and the fixed opening member and the movable blades are not in contact with each other, the movable blades approach the fixed opening member as the amount of upward warpage increases.

22. The light shielding unit according to claim 1,
wherein the first frame has a first wall that covers a gap formed between the first frame and the second frame, from the outside in the radial direction,
the second frame has a second wall that covers a gap formed between the first frame and the second frame, from the outside in the radial direction, and
the first wall and the second wall are disposed so as to cover the gap from different directions.

23. A lens barrel, comprising:
the light shielding unit according to claim 1; and
a plurality of lens groups that guide the light incident on the light shielding unit in the desired direction.

24. The lens barrel according to claim 23,
wherein the light shielding unit is an aperture unit that adjusts the amount of light passing through the plurality of lens groups.

25. A light shielding unit, comprising:
a first frame having a first opening through which light passes in an optical axis direction;
a second frame having a second opening through which the light passes in the optical axis direction;
a plurality of movable blades that are disposed between the first frame and the second frame, in which is formed a third opening through which the light that has passed through the first opening passes, and that adjust the amount of light passing through by varying the size of the third opening;
a drive ring that is disposed between the first frame and the second frame and is rotatably driven when the movable blades are opened and closed; and
a support that is provided to at least of the drive ring, the first frame and the second frame and supports the movable blades in the direction of suppressing upward warpage of the movable blades in a state in which the movable blades have moved in the direction of reducing the size of the third opening,
wherein the movable blades have a first main shaft or a first main hole, and a first auxiliary shaft or a first auxiliary hole, and
the movable blades include first blades having a rotating portion that is provided on a second end side that is the opposite side from the first main shaft or the first main hole, and rotates along a gap between the first frame and the second frame so that the second end side remains sandwiched between the first frame and the second frame and is not exposed via the first opening or the second opening in the optical axis direction, and
when the drive ring is rotationally driven, there is a change in the relative positions between the first main shaft or the first main hole and the first auxiliary shaft or the first auxiliary hole, and
the first blades rotate around the first main shaft or the first main hole, and the size of the third opening changes.

26. The light shielding unit according to claim 25,
wherein the movable blades include second blades having a second main shaft or a second main hole provided on a first end side, and a free end provided on a second end side that is on the opposite side from the second main shaft or the second main hole, and when the movable member moves in the direction of reducing the size of the third opening, the free end side rotates around the second main shaft or the second main hole and toward the center axis of the third opening, and
wherein the first blades and the second blades are disposed alternately in the circumferential direction.

27. A light shielding unit, comprising:
a first frame having a first opening through which light passes;
a second frame having a second opening through which the light passes; and
a plurality of movable blades that are disposed between the first frame and the second frame, in which is formed a third opening through which the light that has passed through the first opening passes, and that adjust the amount of light passing through by varying the size of the third opening, the movable blades having a first main shaft or a first main hole provided on a first end side, and a free end provided on a second end side that is on the opposite side from the first main shaft or the first main hole,
wherein the movable blades have a shape exhibiting a continuous bend that is curved, starting at a position between an approximate center along a length of the blade and the first main shaft or the first main hole toward the second end side including the free end, ahead of time in the opposite direction from that of upward warpage due to blade weaving,
the movable blades have a shape that is warped to the opposite side from the direction of upward warpage of the movable blades in a state where the movable blades have moved in the direction of reducing the size of the third opening, and
the light shield unit is constituted by the movable blades having the shape that is bent.

28. A lens barrel, comprising:
the light shielding unit according to claim 27; and
a plurality of lens groups that guide the light incident on the light shielding unit in the desired direction.

29. A light shielding unit, comprising:
a first frame having a first opening through which light passes in an optical axis direction;
a second frame having a second opening through which the light passes in the optical axis direction; and
a plurality of movable blades that are disposed between the first frame and the second frame, in which is formed a third opening through which the light that has passed through the first opening passes, and that adjust the amount of light passing through by varying the size of the third opening,
wherein the movable blades include first blades having a first main shaft or a first main hole provided on a first end side, and a free end provided on a second end side that is on the opposite side from the first main shaft or the first main hole, and second blades having a rotating portion that is provided on a second end side that is the opposite side from a second main shaft or a second main hole, and rotates along a gap between the first frame and the second frame,
the second blades are in a state in which the first end and the second end are always held between the first frame and the second frame in any state in which the second blades have rotated to reduce an opening diameter of the third opening, so that the first end and the second end remain sandwiched between the first frame and the second frame and are not exposed via the first opening or the second opening in the optical axis direction, and
the first blades and the second blades are disposed alternately in the circumferential direction on at least some blades.

30. The light shielding unit according to claim 29,
wherein the free ends of the first blade move from between the first frame and the second frame to near the optical axis.

31. A lens barrel, comprising:
the light shielding unit according to claim 29; and
a plurality of lens groups that guide the light incident on the light shielding unit in the desired direction.

32. A light shielding unit, comprising:
a first frame having a first opening through which light passes;
a second frame having a second opening through which the light passes;
a plurality of movable blades that are disposed between the first frame and the second frame, in which is formed a third opening through which the light that has passed through the first opening passes, and that adjust the amount of light passing through by varying the size of the third opening;
a fixed opening sheet that is fixed to the second frame and constitutes a fixed opening with substantially the same size as or smaller than the third opening when the movable blades are in a fully opened state, and
a spacer part that is a part of the second frame and is provided to between the movable blades and the fixed opening which is in an optical axis direction,
wherein, when the movable blades move in the direction of reducing the size of the third opening, the movable blades move in the same direction as the direction of the upward warpage, so as to go beyond the virtual plane constituting the fixed opening formed by the fixed opening sheet, and
the fixed opening sheet is provided to an opposite side of the movable blades in the optical axis direction so that the fixed opening sheet sandwiches the spacer part with the movable blades.

33. A lens barrel, comprising:
the light shielding unit according to claim 32; and
a plurality of lens groups that guide the light incident on the light shielding unit in the desired direction.

\* \* \* \* \*